United States Patent
Hong et al.

(10) Patent No.: US 10,001,888 B2
(45) Date of Patent: Jun. 19, 2018

(54) TOUCH SENSOR PANEL DESIGN

(71) Applicant: Apple Inc., Cupertino, CA (US)

(72) Inventors: Seung Jae Hong, Sunnyvale, CA (US); Martin Paul Grunthaner, Los Altos Hills, CA (US); Steven Porter Hotelling, Los Gatos, CA (US); Lynn Youngs, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 14/645,120

(22) Filed: Mar. 11, 2015

(65) Prior Publication Data
US 2015/0227240 A1 Aug. 13, 2015

Related U.S. Application Data

(63) Continuation of application No. 14/055,717, filed on Oct. 16, 2013, now Pat. No. 8,982,096, which is a (Continued)

(51) Int. Cl.
G06F 3/044 (2006.01)
G06F 1/16 (2006.01)
G06F 3/041 (2006.01)

(52) U.S. Cl.
CPC ............ *G06F 3/044* (2013.01); *G06F 1/16* (2013.01); *G06F 3/041* (2013.01); *G06F 3/0412* (2013.01);
(Continued)

(58) Field of Classification Search
CPC ........ G06F 3/044; G06F 3/041; G06F 3/0412; G06F 1/16; G06F 2203/04111; G06F 2203/04112; Y10T 29/49117
(Continued)

(56) References Cited

U.S. PATENT DOCUMENTS 4,087,625 A 5/1978 Dym et al.
4,090,092 A 5/1978 Serrano
(Continued)

FOREIGN PATENT DOCUMENTS

CN 1246638 A 3/2000
CN 1527274 A 9/2004
(Continued)

OTHER PUBLICATIONS

Non-Final Office Action dated Apr. 10, 2015, for U.S. Appl. No. 14/082,074, filed Nov. 15, 2013, 23 pages.
(Continued)

*Primary Examiner* — Amare Mengistu
*Assistant Examiner* — Jennifer Zubajlo
(74) *Attorney, Agent, or Firm* — Morrison & Foerster LLP

(57) ABSTRACT

A touch sensor panel including a plurality of drive lines crossing a plurality of sense lines, forming an array. The plurality of drive lines and the plurality of sense lines are formed by interconnecting sections of at least one conductive material having a truncated diamond shape or formed of interconnected conductive lines. At least one conductive dummy region may be disposed in an area of the touch sensor panel around the truncated diamond shape sections or interconnected conductive lines of the plurality of drive lines and the plurality of sense lines. One or more lines may be formed overlapping the interconnected sections of each of the plurality of drive lines and the plurality of sense lines.

15 Claims, 14 Drawing Sheets

Related U.S. Application Data continuation of application No. 13/737,779, filed on Jan. 9, 2013, now Pat. No. 8,593,425, which is a continuation of application No. 12/500,911, filed on Jul. 10, 2009, now Pat. No. 8,593,410.

(60) Provisional application No. 61/168,543, filed on Apr. 10, 2009.

(52) U.S. Cl.
CPC ............ *G06F 2203/04111* (2013.01); *G06F 2203/04112* (2013.01); *Y10T 29/49117* (2015.01)

(58) Field of Classification Search
USPC .................................................. 345/173–179
See application file for complete search history.

(56) References Cited

U.S. PATENT DOCUMENTS

| | | |
|---|---|---|
| 4,304,976 A | 12/1981 | Gottbreht et al. |
| 4,475,235 A | 10/1984 | Graham |
| 4,550,221 A | 10/1985 | Mabusth |
| 4,659,874 A | 4/1987 | Landmeier |
| 5,194,862 A | 3/1993 | Edwards |
| 5,317,919 A | 6/1994 | Awtrey |
| 5,459,463 A | 10/1995 | Gruaz et al. |
| 5,483,261 A | 1/1996 | Yasutake |
| 5,488,204 A | 1/1996 | Mead et al. |
| 5,543,590 A | 8/1996 | Gillespie et al. |
| 5,631,670 A | 5/1997 | Tomiyoshi et al. |
| 5,825,352 A | 10/1998 | Bisset et al. |
| 5,835,079 A | 11/1998 | Shieh |
| 5,841,078 A | 11/1998 | Miller et al. |
| 5,844,506 A | 12/1998 | Binstead |
| 5,880,411 A | 3/1999 | Gillespie et al. |
| 5,914,465 A | 6/1999 | Allen et al. |
| 6,057,903 A | 5/2000 | Colgan et al. |
| 6,137,427 A | 10/2000 | Binstead |
| 6,163,313 A | 12/2000 | Aroyan et al. |
| 6,188,391 B1 | 2/2001 | Seely et al. |
| 6,239,788 B1 | 5/2001 | Nohno et al. |
| 6,310,610 B1 | 10/2001 | Beaton et al. |
| 6,323,846 B1 | 11/2001 | Westerman et al. |
| 6,452,514 B1 | 9/2002 | Philipp |
| 6,456,952 B1 | 9/2002 | Nathan |
| 6,690,387 B2 | 2/2004 | Zimmerman et al. |
| 6,730,863 B1 | 5/2004 | Gerpheide et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,180,508 B2 | 2/2007 | Kent et al. |
| 7,184,064 B2 | 2/2007 | Zimmerman et al. |
| 7,337,085 B2 | 2/2008 | Soss |
| 7,412,586 B1 | 8/2008 | Rajopadhye et al. |
| 7,504,833 B1 | 3/2009 | Sequine |
| 7,538,760 B2 | 5/2009 | Hotelling et al. |
| 7,548,073 B2 | 6/2009 | Mackey et al. |
| 7,639,234 B2 | 12/2009 | Orsley |
| 7,663,607 B2 | 2/2010 | Hotelling et al. |
| 7,701,539 B2 | 4/2010 | Shih et al. |
| 7,719,523 B2 | 5/2010 | Hillis |
| 7,907,126 B2 | 3/2011 | Yoon et al. |
| 7,932,898 B2 | 4/2011 | Philipp et al. |
| 8,026,904 B2 | 9/2011 | Westerman |
| 8,040,321 B2 | 10/2011 | Peng |
| 8,040,326 B2 | 10/2011 | Hotelling et al. |
| 8,045,783 B2 | 10/2011 | Lee et al. |
| 8,058,884 B2 | 11/2011 | Betancourt |
| 8,068,097 B2 | 11/2011 | GuangHai |
| 8,120,371 B2 | 2/2012 | Day et al. |
| 8,125,312 B2 | 2/2012 | Orr |
| 8,169,421 B2 | 5/2012 | Wright |
| 8,223,133 B2 | 7/2012 | Hristov |
| 8,258,986 B2 | 9/2012 | Makovetskyy |
| 8,259,078 B2 | 9/2012 | Hotelling et al. |
| 8,283,935 B2 | 10/2012 | Liu et al. |
| 8,319,747 B2 | 11/2012 | Hotelling et al. |
| 8,339,286 B2 | 12/2012 | Cordeiro |
| 8,441,464 B1 | 5/2013 | Lin et al. |
| 8,479,122 B2 | 7/2013 | Hotelling et al. |
| 8,484,838 B2 * | 7/2013 | Badaye ................ G06F 3/044 29/846 |
| 8,487,898 B2 | 7/2013 | Hotelling |
| 8,507,811 B2 | 8/2013 | Hotelling et al. |
| 8,537,126 B2 | 9/2013 | Yousefpor et al. |
| 8,542,208 B2 | 9/2013 | Krah et al. |
| 8,576,193 B2 | 11/2013 | Hotelling |
| 8,593,410 B2 | 11/2013 | Hong |
| 8,593,425 B2 | 11/2013 | Hong et al. |
| 8,614,688 B2 | 12/2013 | Chang |
| 8,633,915 B2 | 1/2014 | Hotelling et al. |
| 8,680,877 B2 * | 3/2014 | Lee ........................ G06F 3/044 324/658 |
| 8,760,412 B2 | 6/2014 | Hotelling et al. |
| 8,773,146 B1 | 7/2014 | Hills et al. |
| 8,810,543 B1 | 8/2014 | Kurikawa |
| 8,884,917 B2 | 11/2014 | Seo |
| 8,902,172 B2 | 12/2014 | Peng |
| 8,922,521 B2 | 12/2014 | Hotelling et al. |
| 8,957,874 B2 | 2/2015 | Elias |
| 8,976,133 B2 | 3/2015 | Yao et al. |
| 8,982,096 B2 | 3/2015 | Hong et al. |
| 9,001,082 B1 | 4/2015 | Rosenberg et al. |
| 9,035,895 B2 | 5/2015 | Bussat et al. |
| 9,075,463 B2 | 7/2015 | Pyo et al. |
| 9,086,774 B2 | 7/2015 | Hotelling et al. |
| 9,261,997 B2 | 2/2016 | Chang et al. |
| 9,280,251 B2 | 3/2016 | Shih |
| 9,292,137 B2 | 3/2016 | Kogo |
| 9,317,165 B2 | 4/2016 | Hotelling et al. |
| 9,329,674 B2 | 5/2016 | Lee et al. |
| 9,329,723 B2 | 5/2016 | Benbasat et al. |
| 9,372,576 B2 | 6/2016 | Westerman |
| 9,582,131 B2 | 2/2017 | Elias |
| 9,874,975 B2 | 1/2018 | Benbasat et al. |
| 9,880,655 B2 | 1/2018 | O'Connor |
| 9,886,141 B2 | 2/2018 | Yousefpor |
| 2003/0076325 A1 | 4/2003 | Thrasher |
| 2003/0164820 A1 | 9/2003 | Kent |
| 2003/0210235 A1 | 11/2003 | Roberts |
| 2004/0017362 A1 | 1/2004 | Mulligan et al. |
| 2004/0061687 A1 | 4/2004 | Kent et al. |
| 2004/0090429 A1 | 5/2004 | Geaghan et al. |
| 2004/0188151 A1 | 9/2004 | Gerpheide et al. |
| 2004/0239650 A1 | 12/2004 | Mackey |
| 2005/0007353 A1 | 1/2005 | Smith et al. |
| 2005/0012724 A1 | 1/2005 | Kent |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0126831 A1 | 6/2005 | Richter et al. |
| 2005/0146509 A1 | 7/2005 | Geaghan et al. |
| 2005/0239532 A1 | 10/2005 | Inamura |
| 2005/0270039 A1 | 12/2005 | Mackey |
| 2005/0270273 A1 * | 12/2005 | Marten ................ G06F 3/044 345/173 |
| 2005/0280639 A1 | 12/2005 | Taylor et al. |
| 2006/0001640 A1 | 1/2006 | Lee |
| 2006/0017710 A1 | 1/2006 | Lee et al. |
| 2006/0038791 A1 | 2/2006 | Mackey |
| 2006/0132463 A1 | 6/2006 | Lee et al. |
| 2006/0146484 A1 | 7/2006 | Kim et al. |
| 2006/0197753 A1 | 9/2006 | Hotelling |
| 2006/0202969 A1 | 9/2006 | Hauck |
| 2006/0238522 A1 | 10/2006 | Westerman et al. |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0293864 A1 | 12/2006 | Soss |

(56) References Cited

U.S. PATENT DOCUMENTS

| | | |
|---|---|---|
| 2007/0008299 A1* | 1/2007 | Hristov ............... G06F 3/0416 345/173 |
| 2007/0012665 A1 | 1/2007 | Nelson et al. |
| 2007/0023523 A1 | 2/2007 | Onishi |
| 2007/0074914 A1* | 4/2007 | Geaghan ............... G06F 3/044 178/18.06 |
| 2007/0075982 A1 | 4/2007 | Morrison et al. |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0262969 A1 | 11/2007 | Pak |
| 2007/0268273 A1 | 11/2007 | Westerman et al. |
| 2007/0268275 A1 | 11/2007 | Westerman et al. |
| 2007/0279395 A1 | 12/2007 | Philipp |
| 2007/0283832 A1 | 12/2007 | Hotelling |
| 2007/0285365 A1 | 12/2007 | Lee |
| 2008/0006454 A1 | 1/2008 | Hotelling |
| 2008/0018581 A1 | 1/2008 | Park et al. |
| 2008/0024456 A1 | 1/2008 | Peng |
| 2008/0036742 A1 | 2/2008 | Garmon |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0062140 A1 | 3/2008 | Hotelling et al. |
| 2008/0062148 A1 | 3/2008 | Hotelling et al. |
| 2008/0062151 A1 | 3/2008 | Kent |
| 2008/0074398 A1 | 3/2008 | Wright |
| 2008/0136787 A1 | 6/2008 | Yeh et al. |
| 2008/0136792 A1 | 6/2008 | Peng et al. |
| 2008/0158145 A1 | 7/2008 | Westerman |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0188267 A1 | 8/2008 | Sagong |
| 2008/0224962 A1 | 9/2008 | Kasai et al. |
| 2008/0238871 A1 | 10/2008 | Tam |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1* | 12/2008 | Hotelling .......... G02F 1/134363 345/173 |
| 2008/0309629 A1 | 12/2008 | Westerman et al. |
| 2008/0309632 A1 | 12/2008 | Westerman et al. |
| 2008/0309633 A1* | 12/2008 | Hotelling ............... G06F 3/0412 345/173 |
| 2008/0309635 A1 | 12/2008 | Matsuo |
| 2009/0002337 A1 | 1/2009 | Chang |
| 2009/0019344 A1 | 1/2009 | Yoon et al. |
| 2009/0020343 A1 | 1/2009 | Rothkopf et al. |
| 2009/0054107 A1 | 2/2009 | Feland et al. |
| 2009/0070681 A1 | 3/2009 | Dawes et al. |
| 2009/0073138 A1 | 3/2009 | Lee et al. |
| 2009/0085894 A1 | 4/2009 | Gandhi et al. |
| 2009/0091551 A1* | 4/2009 | Hotelling ............... G06F 3/0416 345/174 |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0160787 A1 | 6/2009 | Westerman et al. |
| 2009/0174676 A1 | 7/2009 | Westerman |
| 2009/0174688 A1 | 7/2009 | Westerman |
| 2009/0182189 A1 | 7/2009 | Lira |
| 2009/0184937 A1 | 7/2009 | Grivna |
| 2009/0194344 A1* | 8/2009 | Harley ............... G06F 3/044 178/18.06 |
| 2009/0205879 A1 | 8/2009 | Halsey, IV et al. |
| 2009/0213090 A1 | 8/2009 | Mamba et al. |
| 2009/0236151 A1 | 9/2009 | Yeh et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0273577 A1 | 11/2009 | Chen et al. |
| 2009/0303189 A1 | 12/2009 | Grunthaner et al. |
| 2009/0309850 A1 | 12/2009 | Yang |
| 2009/0314621 A1 | 12/2009 | Hotelling |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0006350 A1 | 1/2010 | Elias |
| 2010/0007616 A1 | 1/2010 | Jang |
| 2010/0039396 A1 | 2/2010 | Ho et al. |
| 2010/0059294 A1* | 3/2010 | Elias ............... G06F 3/044 178/18.06 |
| 2010/0060608 A1 | 3/2010 | Yousefpor |
| 2010/0079384 A1 | 4/2010 | Grivna |
| 2010/0079401 A1 | 4/2010 | Staton |
| 2010/0102027 A1 | 4/2010 | Liu et al. |
| 2010/0110035 A1 | 5/2010 | Selker |
| 2010/0117985 A1 | 5/2010 | Wadia |
| 2010/0143848 A1 | 6/2010 | Jain et al. |
| 2010/0149108 A1 | 6/2010 | Hotelling et al. |
| 2010/0156846 A1 | 6/2010 | Long et al. |
| 2010/0194696 A1 | 8/2010 | Chang et al. |
| 2010/0194707 A1 | 8/2010 | Hotelling et al. |
| 2010/0245286 A1 | 9/2010 | Parker |
| 2010/0253638 A1 | 10/2010 | Yousefpor et al. |
| 2010/0328248 A1 | 12/2010 | Mozdzyn |
| 2011/0007020 A1 | 1/2011 | Hong |
| 2011/0025629 A1 | 2/2011 | Grivna et al. |
| 2011/0025635 A1 | 2/2011 | Lee |
| 2011/0096016 A1 | 4/2011 | Yilmaz |
| 2011/0134050 A1 | 6/2011 | Harley |
| 2011/0175846 A1 | 7/2011 | Wang et al. |
| 2011/0199105 A1 | 8/2011 | Otagaki et al. |
| 2011/0227874 A1 | 9/2011 | Faahraeus et al. |
| 2011/0231139 A1 | 9/2011 | Yokota |
| 2011/0241907 A1 | 10/2011 | Cordeiro |
| 2011/0248949 A1 | 10/2011 | Chang et al. |
| 2011/0261005 A1 | 10/2011 | Joharapurkar et al. |
| 2011/0261007 A1 | 10/2011 | Joharapurkar et al. |
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1 | 12/2011 | Keski-Jaskari et al. |
| 2012/0026099 A1 | 2/2012 | Harley |
| 2012/0044199 A1 | 2/2012 | Karpin et al. |
| 2012/0050206 A1 | 3/2012 | Welland |
| 2012/0050216 A1 | 3/2012 | Kremin et al. |
| 2012/0054379 A1 | 3/2012 | Leung et al. |
| 2012/0056662 A1 | 3/2012 | Wilson et al. |
| 2012/0056851 A1 | 3/2012 | Chen et al. |
| 2012/0092288 A1 | 4/2012 | Wadia |
| 2012/0113047 A1 | 5/2012 | Hanauer |
| 2012/0146726 A1 | 6/2012 | Huang |
| 2012/0146942 A1 | 6/2012 | Kamoshida et al. |
| 2012/0154324 A1 | 6/2012 | Wright et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0211264 A1 | 8/2012 | Milne |
| 2012/0262395 A1 | 10/2012 | Chan |
| 2012/0320385 A1 | 12/2012 | Mu et al. |
| 2013/0015868 A1 | 1/2013 | Peng |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0057511 A1 | 3/2013 | Shepelev et al. |

(56) References Cited

U.S. PATENT DOCUMENTS

| | | |
|---|---|---|
| 2013/0069911 A1 | 3/2013 | You |
| 2013/0076648 A1 | 3/2013 | Krah et al. |
| 2013/0100038 A1 | 4/2013 | Yilmaz et al. |
| 2013/0120303 A1 | 5/2013 | Hong et al. |
| 2013/0127739 A1 | 5/2013 | Guard et al. |
| 2013/0141383 A1 | 6/2013 | Woolley |
| 2013/0154996 A1 | 6/2013 | Trend et al. |
| 2013/0173211 A1 | 7/2013 | Hoch et al. |
| 2013/0176271 A1 | 7/2013 | Sobel et al. |
| 2013/0176273 A1 | 7/2013 | Li et al. |
| 2013/0215049 A1 | 8/2013 | Lee |
| 2013/0224370 A1 | 8/2013 | Cok et al. |
| 2013/0234964 A1 | 9/2013 | Kim et al. |
| 2013/0257785 A1 | 10/2013 | Brown et al. |
| 2013/0257797 A1 | 10/2013 | Wu et al. |
| 2013/0257798 A1 | 10/2013 | Tamura et al. |
| 2013/0265276 A1 | 10/2013 | Obeidat et al. |
| 2013/0271427 A1 | 10/2013 | Benbasat |
| 2013/0278447 A1 | 10/2013 | Kremin |
| 2013/0278498 A1 | 10/2013 | Jung et al. |
| 2013/0278525 A1 | 10/2013 | Lim et al. |
| 2013/0307821 A1 | 11/2013 | Kogo |
| 2013/0321289 A1 | 12/2013 | Dubery et al. |
| 2013/0342479 A1 | 12/2013 | Pyo et al. |
| 2014/0002406 A1 | 1/2014 | Cormier et al. |
| 2014/0009438 A1 | 1/2014 | Liu et al. |
| 2014/0022186 A1 | 1/2014 | Hong et al. |
| 2014/0022201 A1 | 1/2014 | Boychuk |
| 2014/0043546 A1 | 2/2014 | Yamazaki et al. |
| 2014/0071084 A1 | 3/2014 | Sugiura |
| 2014/0078096 A1 | 3/2014 | Tan et al. |
| 2014/0104225 A1 | 4/2014 | Davidson et al. |
| 2014/0104228 A1 | 4/2014 | Chen et al. |
| 2014/0111707 A1 | 4/2014 | Song et al. |
| 2014/0132560 A1 | 5/2014 | Huang et al. |
| 2014/0132860 A1 | 5/2014 | Hotelling et al. |
| 2014/0145997 A1 | 5/2014 | Tiruvuru |
| 2014/0160376 A1 | 6/2014 | Wang et al. |
| 2014/0168540 A1 | 6/2014 | Wang et al. |
| 2014/0204043 A1 | 7/2014 | Lin et al. |
| 2014/0240291 A1 | 8/2014 | Nam |
| 2014/0247245 A1 | 9/2014 | Lee |
| 2014/0253470 A1 | 9/2014 | Havilio |
| 2014/0267070 A1 | 9/2014 | Shahparnia et al. |
| 2014/0267128 A1 | 9/2014 | Bulea et al. |
| 2014/0267146 A1 | 9/2014 | Chang et al. |
| 2014/0285469 A1 | 9/2014 | Wright et al. |
| 2014/0347574 A1 | 11/2014 | Tung et al. |
| 2014/0354301 A1 | 12/2014 | Trend |
| 2014/0362034 A1 | 12/2014 | Mo et al. |
| 2014/0368436 A1 | 12/2014 | Abzarian et al. |
| 2014/0368460 A1 | 12/2014 | Mo et al. |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1 | 1/2015 | Brunet et al. |
| 2015/0002464 A1 | 1/2015 | Nishioka et al. |
| 2015/0015528 A1 | 1/2015 | Vandermeijden |
| 2015/0026398 A1 | 1/2015 | Kim |
| 2015/0042607 A1 | 2/2015 | Takanohashi |
| 2015/0049043 A1 | 2/2015 | Yousefpor |
| 2015/0049044 A1 | 2/2015 | Yousefpor |
| 2015/0077375 A1 | 3/2015 | Hotelling et al. |
| 2015/0103047 A1 | 4/2015 | Hanauer et al. |
| 2015/0123939 A1 | 5/2015 | Kim et al. |
| 2015/0242028 A1 | 8/2015 | Roberts et al. |
| 2015/0253907 A1 | 9/2015 | Elias |
| 2015/0268789 A1 | 9/2015 | Liao et al. |
| 2015/0268795 A1 | 9/2015 | Kurasawa et al. |
| 2015/0309610 A1 | 10/2015 | Rabii et al. |
| 2015/0370387 A1 | 12/2015 | Yamaguchi et al. |
| 2015/0378465 A1 | 12/2015 | Shih et al. |
| 2016/0011702 A1 | 1/2016 | Shih |
| 2016/0018348 A1 | 1/2016 | Yau et al. |
| 2016/0062533 A1 | 3/2016 | O'Connor |
| 2016/0139728 A1 | 5/2016 | Jeon et al. |
| 2016/0154505 A1 | 6/2016 | Chang |
| 2016/0154529 A1 | 6/2016 | Westerman |
| 2016/0195954 A1 | 7/2016 | Wang et al. |
| 2016/0224177 A1 | 8/2016 | Krah |
| 2016/0224189 A1 | 8/2016 | Yousefpor et al. |
| 2016/0246423 A1 | 8/2016 | Fu |
| 2016/0266676 A1 | 9/2016 | Wang et al. |
| 2016/0266679 A1 | 9/2016 | Shahparnia et al. |
| 2016/0283023 A1 | 9/2016 | Shin et al. |
| 2016/0299603 A1 | 10/2016 | Tsujioka et al. |
| 2016/0357344 A1 | 12/2016 | Benbasat et al. |
| 2017/0090619 A1 | 3/2017 | Yousefpor |
| 2017/0090622 A1 | 3/2017 | Badaye |
| 2017/0097703 A1 | 4/2017 | Lee |
| 2017/0139539 A1 | 5/2017 | Yao et al. |
| 2017/0168626 A1 | 6/2017 | Konicek |
| 2017/0285804 A1 | 10/2017 | Yingxuan et al. |

FOREIGN PATENT DOCUMENTS

| | | |
|---|---|---|
| CN | 1672119 A | 9/2005 |
| CN | 1689677 A | 11/2005 |
| CN | 1711520 A | 12/2005 |
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| CN | 101419516 A | 4/2009 |
| CN | 103049148 A | 4/2013 |
| CN | 103294321 A | 9/2013 |
| CN | 103 365 500 A | 10/2013 |
| CN | 103809810 A | 5/2014 |
| CN | 104020908 A | 9/2014 |
| DE | 11 2008 001 245 T5 | 3/2010 |
| DE | 10 2011 089693 A1 | 6/2013 |
| EP | 0 853 230 A1 | 7/1998 |
| EP | 1 192 585 A1 | 12/2000 |
| EP | 1 192 585 B2 | 12/2000 |
| EP | 1 573 706 A2 | 2/2004 |
| EP | 1 573 706 A3 | 2/2004 |
| EP | 1 455 264 A3 | 9/2004 |
| EP | 1 644 918 A2 | 12/2004 |
| EP | 1 717 677 A2 | 11/2006 |
| EP | 1 717 677 A3 | 11/2006 |
| EP | 1 918 803 A1 | 5/2008 |
| EP | 1 986 084 A1 | 10/2008 |
| EP | 2 077 489 A1 | 7/2009 |
| EP | 2 256 606 A2 | 12/2010 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2 450 207 A | 12/2008 |
| JP | 2000-163031 A | 6/2000 |
| JP | 2002-342033 A | 11/2002 |
| JP | 2004-503835 A | 2/2004 |
| JP | 2005-030901 A | 2/2005 |
| JP | 2005-084128 A | 3/2005 |
| JP | 2005-301373 A | 10/2005 |
| JP | 2007-018515 | 1/2007 |
| JP | 3134925 U | 8/2007 |
| JP | 2008-510251 A | 4/2008 |
| JP | 2008-225415 A | 9/2008 |
| KR | 10-2004-0091728 A | 10/2004 |
| KR | 10-2007-0002327 A | 1/2007 |
| KR | 10-2008-0019125 A | 3/2008 |
| KR | 10-2013-0094495 A | 8/2013 |
| KR | 10-2013-0117499 A | 10/2013 |
| KR | 10-2014-0074454 A | 6/2014 |
| KR | 10-1609992 B1 | 4/2016 |
| TW | 200715015 A | 4/2007 |
| TW | 200826032 A | 6/2008 |
| TW | 2008-35294 A | 8/2008 |
| TW | M341273 U | 9/2008 |
| TW | M344522 | 11/2008 |

(56) References Cited

FOREIGN PATENT DOCUMENTS

| TW | M344544 | 11/2008 |
|---|---|---|
| TW | 201115442 A1 | 5/2011 |
| TW | 201401129 A | 1/2014 |
| TW | 201419071 A | 5/2014 |
| WO | WO-99/35633 A2 | 7/1999 |
| WO | WO-99/35633 A3 | 7/1999 |
| WO | WO-01/097204 A1 | 12/2001 |
| WO | WO-02/080637 A1 | 10/2002 |
| WO | WO-2005/114369 A2 | 12/2005 |
| WO | WO-2006/020305 A2 | 2/2006 |
| WO | WO-2006/020305 A3 | 2/2006 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | WO-2006/130584 A2 | 12/2006 |
| WO | WO-2006/130584 A3 | 12/2006 |
| WO | WO-2007/012899 A1 | 2/2007 |
| WO | WO-2007/034591 A1 | 3/2007 |
| WO | WO-2007/054018 A1 | 5/2007 |
| WO | WO-2007/066488 A1 | 6/2007 |
| WO | WO-2007/089766 A2 | 8/2007 |
| WO | WO-2007/089766 A3 | 8/2007 |
| WO | WO-2007/115032 A2 | 10/2007 |
| WO | WO-2007/146785 A2 | 12/2007 |
| WO | WO-2007/146785 A3 | 12/2007 |
| WO | WO-2008/007118 A2 | 1/2008 |
| WO | WO-2008/007118 A3 | 1/2008 |
| WO | WO-2008/047990 A1 | 4/2008 |
| WO | WO-2008/076237 A2 | 6/2008 |
| WO | WO-2008/076237 A3 | 6/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/103946 A1 | 8/2009 |
| WO | WO-2009/132146 A1 | 10/2009 |
| WO | WO-2009/132150 A1 | 10/2009 |
| WO | WO-2010/088659 A1 | 8/2010 |
| WO | WO-2010/117882 A2 | 10/2010 |
| WO | WO-2011/137200 A1 | 11/2011 |
| WO | WO-2013/158570 A1 | 10/2013 |
| WO | WO-2014/105942 A1 | 7/2014 |
| WO | WO-2014/127716 A1 | 8/2014 |
| WO | WO-2015/017196 A1 | 2/2015 |
| WO | WO-2015/023410 A1 | 2/2015 |
| WO | WO-2015/072722 A1 | 5/2015 |
| WO | WO-2015/107969 A1 | 7/2015 |
| WO | WO-2015/178920 A1 | 11/2015 |
| WO | WO-2016/048269 A1 | 3/2016 |
| WO | WO-2016/069642 A1 | 5/2016 |
| WO | WO-2016/126525 A1 | 8/2016 |
| WO | WO-2016/144437 A1 | 9/2016 |
| WO | WO-2017/058413 A1 | 4/2017 |
| WO | WO-2017/058415 A2 | 4/2017 |

OTHER PUBLICATIONS

Non-Final Office Action dated May 4, 2015, for U.S. Appl. No. 12/642,466, filed Dec. 18, 2009, nine pages.
Non-Final Office Action dated May 8, 2015, for U.S. Appl. No. 14/082,003, filed Nov. 15, 2013, 25 pages.
Final Office Action dated Aug. 31, 2015, for U.S. Appl. No. 14/157,737, filed Jan. 17, 2014, 27 pages.
Cassidy, R. (Feb. 23, 2007). "The Tissot T-Touch Watch—A Groundbreaking Timepiece," located at <http://ezinearticles.com/?The-Tissot-T-Touch-Watch---A-Groundbreaking-Timepiece &id . . . >, last visited Jan. 23, 2009, two pages.
Chinese Search Report dated Jan. 7, 2011, for CN Application No. 2009200081997, filed Apr. 24, 2009, with English Translation, 14 pages.
Chinese Search Report dated Jan. 10, 2011, for CN Application No. 2008201338142, filed Sep. 27, 2008, with English Translation, 25 pages.
Chinese Search Report completed Jun. 3, 2011, for CN Patent Application No. ZL2009201524013, with English Translation, 20 pages.
European Search Report dated Mar. 19, 2009, for EP Application No. 08017396.6, filed Oct. 8, 2008, seven pages.
Final Office Action dated Jun. 8, 2011, for U.S. Appl. No. 12/038,760, filed Feb. 27, 2008, 20 pages.
Final Office Action dated Dec. 15, 2011, for U.S. Appl. No. 12/333,250, filed Dec. 11, 2008, 12 pages.
Final Office Action dated Jan. 5, 2012, for U.S. Appl. No. 12/206,680, filed Sep. 8, 2008, 15 pages.
Final Office Action dated Jan. 19, 2012, for U.S. Appl. No. 12/110,024, filed Apr. 25, 2008, 12 pages.
Final Office Action dated Aug. 31, 2012, for U.S. Appl. No. 12/110,075, filed Apr. 25, 2008, 15 pages.
Final Office Action dated Dec. 24, 2012, for U.S. Appl. No. 12/110,024, filed Apr. 25, 2008, 21 pages.
Final Office Action dated Jan. 3, 2013, for U.S. Appl. No. 11/818,498, filed Jun. 13, 2007, 17 pages.
Final Office Action dated Feb. 1, 2013, for U.S. Appl. No. 12/642,466, filed Dec. 18, 2009, nine pages.
Final Office Action dated Feb. 5, 2013, for U.S. Appl. No. 12/500,911, filed Jul. 10, 2009, 15 pages.
Final Office Action dated Apr. 30, 2013, for U.S. Appl. No. 12/494,173, filed Jun. 29, 2009, 7 pages.
Final Office Action dated May 22, 2013, for U.S. Appl. No. 12/206,680, filed Sep. 8, 2008, 16 pages.
Final Office Action dated Jul. 19, 2013, for U.S. Appl. No. 12,545/604, filed Aug. 21, 2009, 17 pages.
Final Office Action dated Jul. 23, 2013, for U.S. Appl. No. 12,038,760, filed Feb. 27, 2008, 20 pages.
Final Office Action dated Jan. 27, 2014, for U.S. Appl. No. 12/206,680, filed Sep. 8, 2008, 20 pages.
Final Office Action dated Apr. 23, 2014 for U.S. Appl. No. 12/847,987 filed Jul. 30, 2010, 16 pages.
Final Office Action dated May 9, 2014, for U.S. Appl. No. 12/642,466, filed Dec. 18, 2009, 13 pages.
Final Office Action dated Jul. 16, 2014, for U.S. Appl. No. 12/545,604, filed Aug. 21, 2009, 18 pages.
Great Britain Search Report dated Jan. 19, 2009, for GB Application No. GB0817242.1, filed Sep. 22, 2008, two pages.
Great Britain Search Report dated Jan. 19, 2010, for GB Application No. GB0817242.1, filed Sep. 22, 2008, two pages.
International Search Report dated Mar. 19, 2009, for PCT Application No. PCT/US2008/078836, filed on Oct. 3, 2008, four pages.
International Search Report dated Jul. 17, 2009, for PCT Application No. PCT/US2009/041460, three pages.
International Search Report dated Aug. 5, 2009, for PCT Application No. PCT/US2009/041465, filed Apr. 22, 2009, four pages.
International Search Report dated Jan. 14, 2011, for PCT Application No. PCT/US2010/029698, filed Apr. 1, 2010, 5 pages.
International Search Report dated May 2, 2011, for PCT Application No. PCT/US2010/058988, filed Dec. 3, 2010, five pages.
International Search Report dated Jan. 29, 2015, for PCT Application No. PCT/US2014/047888, filed Jul. 23, 2014, six pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Feb. 4, 2011, for U.S. Appl. No. 12/038,760, filed Feb. 27, 2008, 18 pages.
Non-Final Office Action dated Jun. 9, 2011, for U.S. Appl. No. 12/206,680, filed Sep. 8, 2008, 13 pages.
Non-Final Office Action dated Jul. 8, 2011, for U.S. Appl. No. 12/110,075, filed Apr. 25, 2008, 14 pages.
Non-Final Office Action dated Jul. 11, 2011, for U.S. Appl. No. 12/110,024, filed Apr. 25, 2008, 12 pages.
Non-Final Office Action dated Aug. 17, 2011, for U.S. Appl. No. 12/333,250, filed Dec. 11, 2008, 12 pages.
Non-Final Office Action dated Jan. 25, 2012, for U.S. Appl. No. 12/110,075, filed Apr. 25, 2008, 21 pages.
Non-Final Office Action dated May 25, 2012, for U.S. Appl. No. 11/818,498, filed Jun. 13, 2007, 16 pages.

(56) References Cited

OTHER PUBLICATIONS

Non-Final Office Action dated Jun. 7, 2012, for U.S. Appl. No. 12/500,911, filed Jul. 10, 2009, 16 pages.
Non-Final Office Action dated Jul. 3, 2012, for U.S. Appl. No. 12/110,024, filed Apr. 25, 2008, 19 pages.
Non-Final Office Action dated Aug. 28, 2012, for U.S. Appl. No. 12/642,466, filed Dec. 18, 2009, nine pages.
Non-Final Office Action dated Sep. 26, 2012, for U.S. Appl. No. 12/206,680, filed Sep. 8, 2008, 14 pages.
Non-Final Office Action dated Nov. 28, 2012, for U.S. Appl. No. 12/494,173, filed Jun. 29, 2009, six pages.
Non-Final Office Action dated Jan. 2, 2013, for U.S. Appl. No. 12/038,760, filed Feb. 27, 2008, 18 pages.
Non-Final office Action dated Jan. 7, 2013, for U.S. Appl. No. 12/545,604, filed Aug. 21, 2009, 12 pages.
Non-Final Office Action dated Mar. 28, 2013, for U.S. Appl. No. 12/110,075 filed Apr. 25, 2008, 14 pages.
Non-Final Office Action dated Mar. 29, 2013 for U.S. Appl. No. 13/737,779 filed Jan. 9, 2013, nine pages.
Non-Final Office Action dated Sep. 6, 2013, for U.S. Appl. No. 12/847,987 filed Jul. 30, 2010, 15 pages.
Non-Final Office Action dated Sep. 30, 2013, for U.S. Appl. No. 12/206,680, filed Sep. 8, 2008, 18 pages.
Non-Final Office Action dated Nov. 8, 2013, for U.S. Appl. No. 12/642,466, filed Dec. 18, 2009, 12 pages.
Non-Final office Action dated Dec. 19, 2013, for U.S. Appl. No. 12/545,604, filed Aug. 21, 2009, 17 pages.
Non-Final Office Action dated Apr. 10, 2014, for U.S. Appl. No. 14/055,717, filed Oct. 16, 2013, 10 pages.
Non-Final Office Action dated Feb. 10, 2015, for U.S. Appl. No. 14/157,737, filed Jan. 17, 2014, 23 pages.
Notice of Allowance dated Aug. 28, 2012, for U.S. Appl. No. 12/333,250, filed Dec. 11, 2008, nine pages.
Notice of Allowance dated May 23, 2013, for U.S. Appl. No. 12/110,024, filed Apr. 25, 2008, five pages.
Notice of Allowance dated Aug. 19, 2013, for U.S. Appl. No. 12/110,075, filed Apr. 25, 2008, eight pages.
Notice of Allowance dated Aug. 19, 2013, for U.S. Appl. No. 12/500,911, filed Jul. 10, 2009, six pages.
Notice of Allowance dated Sep. 3, 2013, for U.S. Appl. No. 13/737,779, filed Jan. 9, 2013, 10 pages.
Notice of Allowance dated Nov. 8, 2013, for U.S. Appl. No. 12,038,760, filed Feb. 27, 2008, 15 pages.
Notice of Allowance dated Oct. 15, 2014, for U.S. Appl. No. 12/494,173, filed Jun. 29, 2009, eight pages.
Notice of Allowance dated Nov. 7, 2014, for U.S. Appl. No. 14/055,717, filed Oct. 16, 2013, six pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Search Report dated Apr. 29, 2009, for NL Application No. 2001672, with English translation of Written Opinion, eight pages.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action dated Apr. 8, 2016, for U.S. Appl. No. 13/899,391, filed May 21, 2013, ten pages.
Non-Final Office Action dated Apr. 14, 2016, for U.S. Appl. No. 14/558,529, filed Dec. 2, 2014, 20 pages.
Chinese Search Report completed Dec. 14, 2011, for CN Patent Application No. ZL201020108330X, filed Feb. 2, 2010, with English Translation, 12 pages.
Chinese Search Report completed May 18, 2015, for CN Patent Application No. 201310042816.6, filed Feb. 2, 2010, two pages.
Chinese Search Report dated Nov. 3, 2015, for CN Patent Application No. 201310330348.2 with English Translation, 4 pages.
European Search Report dated Jul. 21, 2010, for EP Patent Application 10151969.2, six pages.
European Search Report dated Apr. 25, 2012, for EP Patent Application No. 08022505.5, 12 pages.
European Search Report dated Dec. 3, 2012, for EP Patent Application No. 12162177.5, seven pages.
European Search Report dated Feb. 13, 2013, for EP Patent Application No. 12192450.0, six pages.
European Search Report dated Aug. 31, 2015, for EP Application No. 15166813.4, eight pages.
Final Office Action dated Jun. 21, 2013, for U.S. Appl. No. 12/545,754, filed Aug. 21, 2009, 6 pages.
Final Office Action dated Aug. 12, 2013, for U.S. Appl. No. 12/238,333, filed Sep. 25, 2008, 19 pages.
Final Office Action dated Aug. 13, 2013, for U.S. Appl. No. 12/238,342, filed Sep. 25, 2008, 14 pages.
Final Office Action dated Oct. 22, 2014, for U.S. Appl. No. 12/238,342, filed Sep. 25, 2008, 16 pages.
Final Office Action dated Oct. 22, 2014, for U.S. Appl. No. 13/448,182, filed Apr. 16, 2012, 11 pages.
Final Office Action dated Apr. 22, 2015, for U.S. Appl. No. 12/238,333, filed Sep. 25, 2008, 23 pages.
Final Office Action dated Jun. 11, 2015, for U.S. Appl. No. 13/448,182, filed Apr. 16, 2012, 12 pages.
Final Office Action dated Nov. 12, 2015, for U.S. Appl. No. 14/082,074, filed Nov. 15, 2013, 22 pages.
Final Office Action dated Jan. 4, 2016, for U.S. Appl. No. 14/082,003, filed Nov. 15, 2013, 25 pages.
Final Office Action dated Jan. 29, 2016, for U.S. Appl. No. 12/642,466, filed Dec. 18, 2009, nine pages.
International Search Report dated Mar. 10, 2010, for PCT Application No. PCT/US2010/22868, filed Feb. 2, 2010, three pages.
International Search Report dated Aug. 6, 2013, for PCT Application No. PCT/US2013/036662, filed Apr. 15, 2013, three pages.
International Search Report dated Sep. 24, 2104, for PCT Application No. PCT/US/2014/39245, eleven pages.
International Search Report dated Dec. 12, 2014, for PCT Application No. PCT/US2014/56795, two pages.
International Search Report dated Jan. 8, 2016, for PCT Application No. PCT/US2015/057644, filed Oct. 27, 2015, four pages.
Malik, S. et al. (2004). "Visual Touchpad: A Two-Handed Gestural Input Device," *Proceedings of the 6th International Conference on Multimodal Interfaces*, State College, PA, Oct. 13-15, 2004, ICMI '04, ACM pp. 289-296.
Non-Final Office Action dated Mar. 9, 2012, for U.S. Appl. No. 12/238,342, filed Sep. 25, 2008, 26 pgs.
Non-Final Office Action dated May 3, 2012, for U.S. Appl. No. 12/238,333, filed Sep. 25, 2008, 22 pgs.
Non-Final Office Action dated Oct. 5, 2012, for U.S. Appl. No. 12/545,754, filed Aug. 21, 2009, 10 pages.
Non-Final Office Action dated Nov. 23, 2012, for U.S. Appl. No. 12/545,557, filed Aug. 21, 2009, 11 pages.
Non-Final Office Action dated Jan. 7, 2013, for U.S. Appl. No. 12/238,333, filed Sep. 25, 2008, 20 pgs.
Non-Final Office Action dated Feb. 15, 2013, for U.S. Appl. No. 12/238,342, filed Sep. 25, 2008, 15 pages.
Non-Final Office Action dated Sep. 10, 2013, for U.S. Appl. No. 12/545,754, filed Aug. 21, 2009, six pages.
Non-Final Office Action dated Jan. 2, 2014, for U.S. Appl. No. 12/545,754, filed Aug. 21, 2009, 11 pages.
Non-Final Office Action dated Jan. 3, 2014 , for U.S. Appl. No. 12/545,557, filed Aug. 21, 2009, 9 pages.
Non-Final Office Action dated Jan. 31, 2014, for U.S. Appl. No. 13/448,182, filed Apr. 16, 2012, 18 pages.
Non-Final Office Action dated Mar. 12, 2014, for U.S. Appl. No. 12/238,342, filed Sep. 25, 2008, 15 pages.
Non-Final Office Action dated Sep. 18, 2014, for U.S. Appl. No. 12/238,333, filed Sep. 25, 2008, 21 pages.
Non-Final Office Action dated Aug. 20, 2015 , for U.S. Appl. No. 14/550,686, filed Nov. 21, 2014, ten pages.

(56) References Cited

OTHER PUBLICATIONS

Non-Final Office Action dated Oct. 6, 2015, for U.S. Appl. No. 14/318,157, filed Jun. 27, 2014, seven pages.
Notice of Allowance mailed Jun. 10, 2013, for U.S. Appl. No. 12/545,557, filed Aug. 21, 2009, 9 pages.
Notice of Allowance dated Apr. 11, 2014, for U.S. Appl. No. 12/545,557, filed Aug. 21, 2009, 9 pages.
Notice of Allowance dated Aug. 21, 2014, for U.S. Appl. No. 12/545,754, filed Aug. 21, 2009, ten pages.
Notice of Allowance dated Mar. 16, 2015, for U.S. Appl. No. 14/312,489, filed Jun. 23, 2014, 10 pages.
Notice of Allowance dated Nov. 2, 2015, for U.S. Appl. No. 14/329,719, filed Jul. 11, 2014, eight pages.
Notice of Allowance dated Dec. 1, 2015, for U.S. Appl. No. 12/238,333, filed Sep. 25, 2008, nine pages.
Notice of Allowance dated Dec. 14, 2015, for U.S. Appl. No. 14/157,737, filed Jan. 17, 2014, five pages.
Notice of Allowance dated Jan. 8, 2016, for U.S. Appl. No. 13/448,182, filed Apr. 16, 2012, nine pages.
Rekimoto, J. (2002). "SmartSkin: An Infrastructure for Freehand Manipulation on Interactive Surfaces," *CHI 2002*, Apr. 20-25, 2002. [(Apr. 20, 2002). 4(1):113-120].
Search Report dated Oct. 14, 2015, for TW Application No. 103116003, one page.
Search Report dated Nov. 12, 2015, for ROC (Taiwan) Patent Application No. 103105965, with English translation, two pages.
Wilson, A.D. (Oct. 15, 2006). "Robust Computer Vision-Based Detection of Pinching for One and Two-Handed Gesture Input," *ACM, USIT '06*, Montreux, Switzerland, Oct. 15-18, 2006, pp. 255-258.
Yang, J-H. et al. (Jul. 2013). "A Noise-Immune High-Speed Readout Circuit for In-Cell Touch Screen Panels," *IEEE Transactions on Circuits and Systems -I: Regular Papers* 60(7):1800-1809.
Final Office Action dated May 9, 2016, for U.S. Appl. No. 14/318,157, filed Jun. 27, 2014, ten pages.
Final Office Action dated Jun. 14, 2016, for U.S. Appl. No. 14/550,686, filed Nov. 21, 2014, ten pages.
Final Office Action dated Sep. 29, 2016, for U.S. Appl. No. 14/558,529, filed Dec. 2, 2014, 22 pages.
Final Office Action dated Nov. 4, 2016, for U.S. Appl. No. 14/082,003, filed Nov. 15, 2013, 18 pages.
International Search Report dated May 9, 2016, for PCT Application No. PCT/US2016/015479, filed Jan. 28, 2016, five pages.
International Search Report dated May 11, 2016, for PCT Application No. PCT/US2016/016011, filed Feb. 1, 2016, six pages.
International Search Report dated Oct. 31, 2016, for PCT Application No. PCT/US2016/048694, filed Aug. 25, 2016, six pages.
Non-Final Office Action dated May 25, 2016, for U.S. Appl. No. 14/082,003, filed Nov. 15, 2013, 23 pages.
Non-Final Office Action dated Jun. 1, 2016, for U.S. Appl. No. 14/615,186, filed Feb. 5, 2015, eight pages.
TW Search Report dated May 4, 2016, for TW Application No. 104115152, one page.
Non-Final Office Action dated Oct. 5, 2015, for U.S. Appl. No. 13/899,391, filed May 21, 2013, ten pages.
Non-Final Office Action dated Dec. 14, 2016, for U.S. Appl. No. 14/550,686, filed Nov. 21, 2014, eight pages.
Non-Final Office Action dated Dec. 19, 2016, for U.S. Appl. No. 14/318,157, filed Jun. 27, 2014, eleven pages.
Non-Final Office Action dated Mar. 13, 2017, for U.S. Appl. No. 14/082,003, filed Nov. 15, 2013, 20 pages.
Non-Final Office Action dated Apr. 7, 2017, for U.S. Appl. No. 15/144,706, filed May 2, 2016, eight pages.
Notice of Allowance dated Dec. 2, 2016, for U.S. Appl. No. 14/615,186, filed Feb. 5, 2015, seven pages.
European Search Report dated Jul. 27, 2017, for EP Application No. 14902458.0, four pages.
Final Office Action dated Jul. 26, 2017, for U.S. Appl. No. 14/318,157, filed Jun. 27, 2014, 10 pages.
Final Office Action dated Aug. 21, 2017, for U.S. Appl. No. 14/550,686, filed Nov. 21, 2014, 11 pages.
Final Office Action dated Dec. 5, 2017, for U.S. Appl. No. 15/006,987, filed Jan. 26, 2016, 16 pages.
Non-Final Office Action dated Jun. 14, 2017, for U.S. Appl. No. 15/006,987, filed Jan. 26, 2016, 14 pages.
Non-Final Office Action dated Jun. 26, 2017, for U.S. Appl. No. 14/558,529, filed Dec. 2, 2014, six pages.
Non-Final Office Action dated Sep. 14, 2017, for U.S. Appl. No. 15/017,463, filed Feb. 5, 2016, 22 pages.
Non-Final Office Action dated Nov. 3, 2017, for U.S. Appl. No. 15/090,555, filed Apr. 4, 2016, 27 pages.
Non-Final Office Action dated Dec. 22, 2017, for U.S. Appl. No. 14/993,017, filed Jan. 11, 2016, 23 pages.
Notice of Allowance dated Sep. 20, 2017, for U.S. Appl. No. 14/082,003, filed Nov. 15, 2013, eight pages.
Notice of Allowance dated Sep. 20, 2017, for U.S. Appl. No. 15/144,706, filed May 2, 2016, nine pages.
Notice of Allowance dated Oct. 3, 2017, for U.S. Appl. No. 14/082,003, filed Nov. 15, 2013, nine pages.
Notice of Allowance dated Oct. 13, 2017, for U.S. Appl. No. 14/558,529, filed Dec. 2, 2014, eight pages.
European Search Report dated Jan. 31, 2018, for EP Application No. 17183937.6, four pages.
Non-Final Office Action dated Jan. 22, 2018, for U.S. Appl. No. 15/097,179, filed Apr. 12, 2016, 11 pages.
Notice of Allowance dated Feb. 9, 2018, for U.S. Appl. No. 14/550,686, filed Nov. 21, 2014, eleven pages.

\* cited by examiner

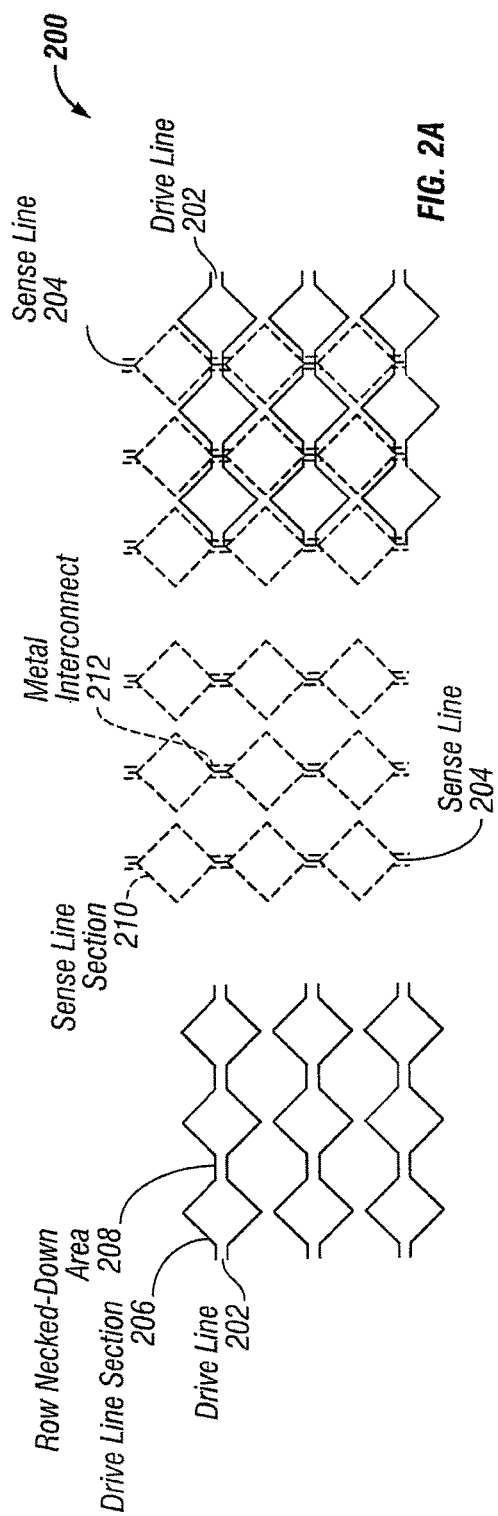
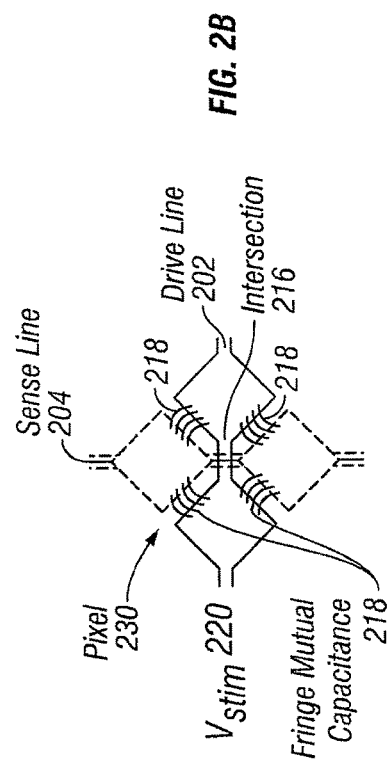

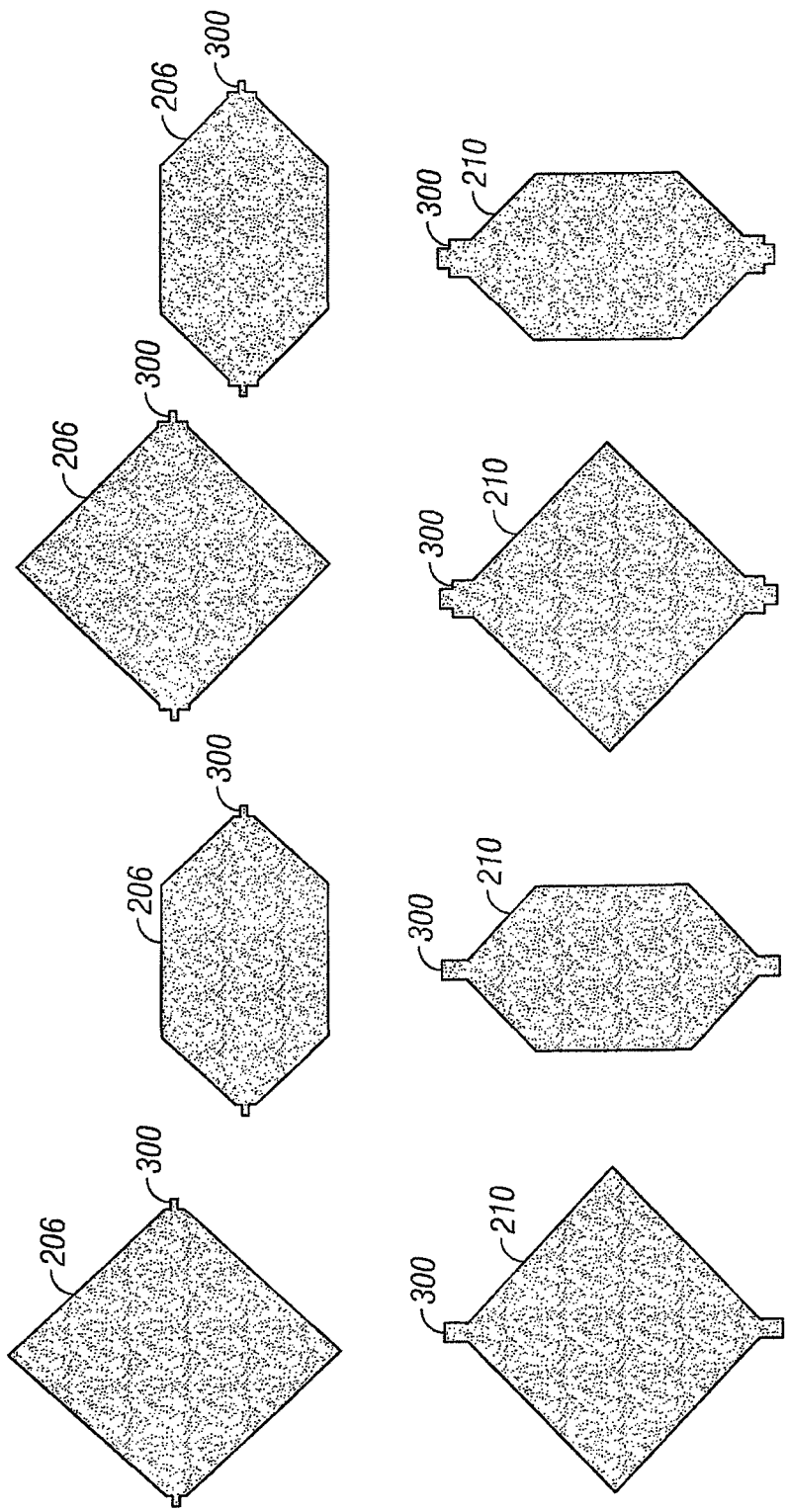

TOUCH SENSOR PANEL DESIGN

FIELD

This relates generally to touch sensor panels, and in particular, to touch sensor panel designs that can improve touch sensitivity and reduce negative optical artifacts.

BACKGROUND

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels can be formed from a matrix of drive and sense lines of a substantially transparent conductive material such as Indium Tim Oxide (ITO), often arranged in rows and columns in horizontal and vertical directions on a substantially transparent substrate. Drive signals can be transmitted through the drive lines, which can result in the formation of static mutual capacitance at the crossover points (sensing pixels) of the drive lines and the sense lines. The static mutual capacitance, and any changes to the static mutual capacitance due to a touch event, can be determined from sense signals that can be generated in the sense lines due to the drive signals.

The touch sensing pixels can be varied in size and/or spacing to enable touch sensitivity in large panels without increasing the number of drive and sense lines which can otherwise increase the processing burden and can cause negative optical artifacts when viewing the display device through the touch panel. However, increasing the size and/or spacing of the touch sensing pixels can negatively impact the resistance and capacitance (RC) time constant per pixel, thereby hindering touch sensitivity of the touch panel and limiting the speed at which the touch panel can operate.

SUMMARY

This relates to a touch sensor panel including a plurality of shaped drive lines and a plurality of shaped sense lines formed on the same layer and utilizing conductive jumpers in crossover locations, according to one embodiment. The plurality of drive lines and the plurality of sense lines can be formed by interconnecting sections of at least one conductive material having a truncated diamond shape to reduce parasitic capacitance, although other shapes can also be used. Either the sections of the plurality of drive lines or the sections of the plurality of sense lines can be interconnected with one or more conductive cross-overs, which can be an opaque metal or other conductive material. A black mask or other opaque covering can be layered over the one or more conductive cross-overs to minimize visual artifacts. Also, at least one conductive dummy region can be disposed in an area of the touch sensor panel around the truncated diamond shaped sections of the plurality of drive lines and the plurality of sense lines to improve optical uniformity and enhance the touch detection capabilities of the touch sensor panel. One or more metal lines can be formed overlapping and electrically connected to the interconnected sections of each of the plurality of drive lines and the plurality of sense lines in order to further reduce resistance.

In an alternate embodiment, the plurality of drive lines and the plurality of sense lines can be formed by interconnecting sections of interconnected conductive lines. According to an embodiment, the interconnected conductive lines are formed of sections of at least one conductive material having an interdigitated comb design. The sections can be formed from a substantially transparent conductive material such as ITO, for example. Alternatively, the interconnected conductive lines may be thin metal lines in a web-like formation, without the substantially transparent conductive material.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 2(a) illustrates an exemplary arrangement of drive and sense lines on the same side of a single substrate according to various embodiments.

FIG. 2(b) illustrates an exemplary pixel generated from diamond-shaped drive and sense lines on the same side of a single substrate according to various embodiments.

FIG. 3(a) illustrates an exemplary diamond-shaped section with thin arms according to various embodiments.

FIG. 3(b) illustrates an exemplary truncated diamond-shaped section with thin arms according to various embodiments.

FIG. 3(c) illustrates an exemplary diamond-shaped section with thick arms according to various embodiments.

FIG. 3(d) illustrates an exemplary truncated diamond-shaped section with thick arms according to various embodiments.

DETAILED DESCRIPTION

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

This relates to the formation of touch sensor panels, and in some embodiments, larger-size touch sensor panels. A touch sensor panel, according to various embodiments, can include a plurality of drive lines crossing a plurality of sense lines, forming an array. The plurality of drive lines and the plurality of sense lines can be formed by interconnecting sections of at least one conductive material having a truncated diamond shape in order to reduce parasitic capacitance, although other shapes can also be used. At least one conductive dummy region can be disposed in an area of the touch sensor panel around the truncated diamond shape sections of the plurality of drive lines and the plurality of sense lines, in order to provide visual uniformity and to further reduce parasitic capacitance. One or more metal lines (or lines formed from other conductive material) may be formed overlapping and in electrical contact with the interconnected sections of each of the plurality of drive lines and the plurality of sense lines, in order to further reduce resistance.

In an alternate embodiment, the plurality of drive lines and the plurality of sense lines can be formed by interconnecting sections of interconnected conductive lines. According to an embodiment, the interconnected conductive lines are formed of sections of at least one conductive material having an interdigitated comb design. The sections can be formed from a substantially transparent conductive material such as ITO, for example. Alternatively, the interconnected conductive lines may be thin metal lines in a web-like formation, without the substantially transparent conductive material.

Although embodiments may be described and illustrated herein in terms of mutual capacitance touch sensor panels, it should be understood that the various embodiments are not so limited, but can be additionally applicable to self-capacitance sensor panels, single and multi-touch sensor panels, and other sensors in which multiple simultaneous stimulation signals are used to generate a composite sense signal. Furthermore, it should be understood that various embodiments are also applicable to various touch sensor panel configurations, such as configurations in which the drive and sense lines are formed in non-orthogonal arrangements, on the back of a cover glass, on the same side of a single substrate, or integrated with display circuitry.

Figure 1:
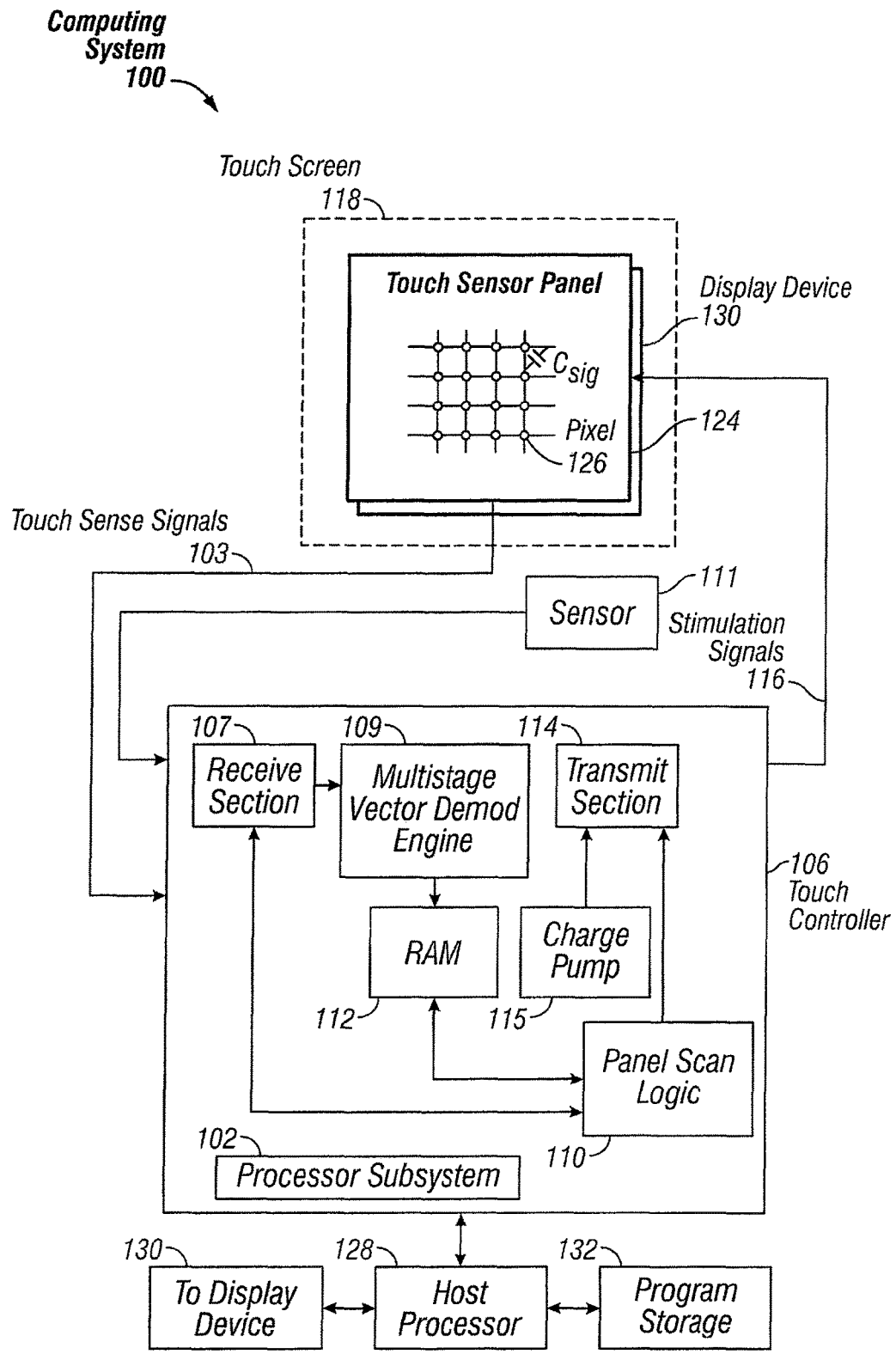
FIG. 1 illustrates an example computing system according to various embodiments.

FIG. 1 illustrates example computing system 100 that can utilize multi-touch controller 106 with integrated drive system according to various embodiments. Touch controller 106 can be a single application specific integrated circuit (ASIC) that can include one or more processor subsystems 102, which can include, for example, one or more main processors, such as ARM968 processors or other processors with similar functionality and capabilities. However, in other embodiments, the processor functionality can be implemented instead by dedicated logic, such as a state machine. Processor subsystems 102 can also include, for example, peripherals (not shown) such as random access memory (RAM) or other types of memory or storage, watchdog timers and the like. Touch controller 106 can also include, for example, receive section 107 for receiving signals, such as touch sense signals 103 from the sense lines of touch sensor panel 124, other signals from other sensors such as sensor 111, etc. Touch controller 106 can also include, for example, a demodulation section such as multistage vector demod engine 109, panel scan logic 110, and a drive system including, for example, transmit section 114. Panel scan logic 110 can access RAM 112, autonomously read data from the sense channels and provide control for the sense channels. In addition, panel scan logic 110 can control transmit section 114 to generate stimulation signals 116 at various frequencies and phases that can be selectively applied to the drive lines of touch sensor panel 124.

Charge pump 115 can be used to generate the supply voltage for the transmit section. Stimulation signals 116 (Vstim) can have amplitudes higher than the maximum voltage the ASIC process can tolerate by cascoding transistors. Therefore, using charge pump 115, the stimulus voltage can be higher (e.g. 6V) than the voltage level a single transistor can handle (e.g. 3.6 V). Although FIG. 1 shows charge pump 115 separate from transmit section 114, the charge pump can be part of the transmit section.

Touch sensor panel 124 can include a capacitive sensing medium having a plurality of drive lines and a plurality of sense lines. The drive and sense lines can be formed from a transparent conductive medium such as Indium Tin Oxide (ITO) or Antimony Tin Oxide (ATO), although other transparent and non-transparent materials such as copper can also be used. In some embodiments, the drive and sense lines can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms "drive lines" and "sense lines"as used herein are intended to encompass not only orthogonal grids, but the intersecting traces of other geometric configurations having first and second dimensions (e.g. the concentric and radial lines of a polar-coordinate arrangement). The drive and sense lines can be formed on, for example, a single side of a substantially transparent substrate.

At the "intersections" of the traces, where the drive and sense lines can pass adjacent to and above and below (cross) each other (but without making direct electrical contact with each other), the drive and sense lines can essentially form two electrodes (although more than two traces could intersect as well). Each intersection of drive and sense lines can represent a capacitive sensing node and can be viewed as picture element (pixel) 126, which can be particularly useful when touch sensor panel 124 is viewed as capturing an "image" of touch. (In other words, after touch controller 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between drive and sense electrodes can appear as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Computing system 100 can also include host processor 128 for receiving outputs from processor subsystems 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. In some embodiments, host processor 128 can be a separate component from touch controller 106, as shown. In other embodiments, host processor 128 can be included as part of touch controller 106. In still other embodiments, the functions of host processor 128 can be performed by processor subsystem 102 and/or distributed among other components of touch controller 106. Display device 130 together with touch sensor panel 124, when located partially or entirely under the touch sensor panel, can form touch screen 118.

Note that one or more of the functions described above can be performed, for example, by firmware stored in memory (e.g., one of the peripherals) and executed by processor subsystem 102, or stored in program storage 132 and executed by host processor 128. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

According to an embodiment of the present disclosure, the drive and sense lines of touch sensor panel 124 may be formed of diamond-shaped or truncated diamond-shaped sections of ITO, for example, that are interconnected. FIG. 2a illustrates exemplary arrangement 200 of diamond-shaped drive and sense lines on the same layer and side of a single substrate. Note that the spatial density of pixels in the arrangement can be made similar to previously disclosed sensor panels, as spatial density can be dependent on the geometry of the diamond-shaped drive and sense lines. Note also that FIG. 2a shows diamond-shaped drive lines 202 and diamond-shaped sense lines 204 separately and superimposed at 200; however, drive lines 202 and sense lines 204 can be disposed on the same layer. In FIG. 2a, each drive line 202 can be formed from areas of substantially transparent ITO 206 ("sections" 206) connected at adjacent facing points by necked-down area 208, although conductive material other than ITO can also be used. Each sense line 204 can be similarly formed from areas of substantially transparent ITO 210 ("sections" 210) or other conductive material connected at adjacent facing points by interconnect area 212 (described in greater detail below), which "jump over" the interconnected drive lines sections 206 at necked-down area 208. Sense lines 204 can be connected to a pre-amplifier held at a virtual ground of, for example, 1.5V, and one or more drive lines 202 can be stimulated with the others held at direct current (DC) voltage levels.

FIG. 2b illustrates exemplary pixel 230 generated from diamond-shaped drive lines 202 and sense lines 204 on the same side of a single substrate according to various embodiments. If drive lines 202 is stimulated with a stimulation signal Vstim 220, a static mutual capacitance can be formed at intersection 216 of the necked-down areas. The static mutual capacitance at intersection 216 can be undesirable because a finger may not be able to block many of the fringing fields. Accordingly, in this embodiment the necked-down areas are made as small as possible; however, alternate arm designs of the diamond sections are described below with reference to other embodiments.

A fringe mutual capacitance 218 can also be formed between the diamonds in the stimulated drive lines and the adjacent sense line diamonds. Fringe mutual capacitance 218 between adjacent diamonds can be of roughly the same order as the mutual capacitance formed between drive and sense lines separated by a substrate. Fringe mutual capacitance 218 between adjacent row and column diamonds can be desirable because a finger or other object may be able to block some of the fringing electric field lines and effect a change in the mutual capacitance that can be detected by the analog channels connected to the rows. As shown in FIG. 2b, there can be four "hot spots" of fringing mutual capacitance indicated at 218 that can be blocked by a finger or other object, and the more that a finger blocks, the greater the change in the mutual capacitance.

FIGS. 3(a)-3(d) show exemplary ITO section architectures of drive lines sections 206 and sense line sections 210 that may be interconnected to form drive lines 202 and/or sense lines 204, although it should be understood that conductive materials other than ITO may also be used. Each section may include a variable size arm 300, which can connect to another arm 300 of an adjoining section or may be electrically connected to interconnect 212, which in turn can be connected to arm 300 of another sense line section 210, for example (e.g., to form sense line 204).

As shown in FIGS. 3(a)-3(d), drive line sections 206 and sense line sections 210 may be truncated (as shown in FIGS. 3(b) and 3(d)), which can reduce parasitic capacitance therein. In general, reducing the surface area of a section at its widest point (e.g., chopping off the corners of the diamond) where the sheet resistance in Ohms per square is lowest can reduce parasitic mutual capacitance without significantly increasing the overall resistance of the section. In addition, through RC time constant simulations, it has been determined that increasing the width of arm 300 as much as possible, with the truncated diamond shape of the drive lines sections 206 and sense line sections 210, can increase conductance C, thus reducing resistance R, as compared to narrower arms 300 with the truncated diamond shape (i.e., FIG. 3(b)). Resistance R simulations of the sections provided in FIGS. 3(a)-(d) are shown in Table 1 below:

TABLE 1

|  | FIG. 3(a) | | FIG. 3(b) | | FIG. 3(c) | | FIG. 3(d) | |
| --- | --- | --- | --- | --- | --- | --- | --- | --- |
|  | Rx | Ry | Rx | Ry | Rx | Ry | Rx | Ry |
| R (Ohms) | 541 | 832 | 576 | 868 | 482 | 556 | 517 | 593 |
| R/pitch (Ohms/mm) | 99 | 144 | 105 | 150 | 88 | 97 | 95 | 103 |

Thus, using a section 206/210 design as shown in FIG. 3(d), for example, parasitic capacitance may be reduced without a significant increase in resistances Rx and Ry.

Figure 4:
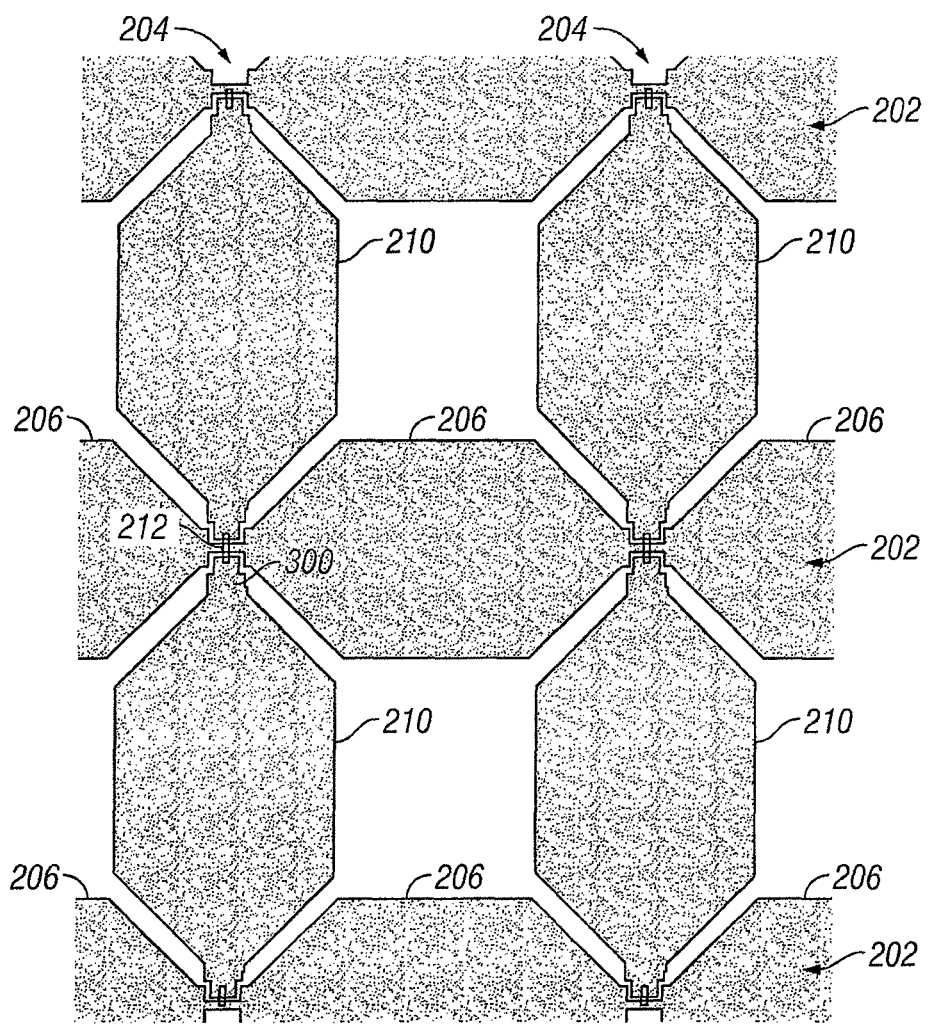
FIG. 4 illustrates an exemplary array of interconnected truncated diamond-shaped sections according to various embodiments.

FIG. 4 shows an exemplary array of drive lines 202 and sense lines 204 formed of interconnected sections 206/210 as shown in FIG. 3(d), according to various embodiments. Drive lines 202 can be formed from connected truncated diamond-shaped sections 206. Sense lines 204 can be formed by interconnecting truncated diamond-shaped sections 210 using interconnects 212, for example, which can connect individual sections 210 by crossing or jumping over sections 206 at their connection point. That is, interconnects 212 can connect individual sections 210 over or under the connection point of sections 206. Interconnects 212 may be any conductive material, such as an opaque metal or ITO.

Figure 5A:
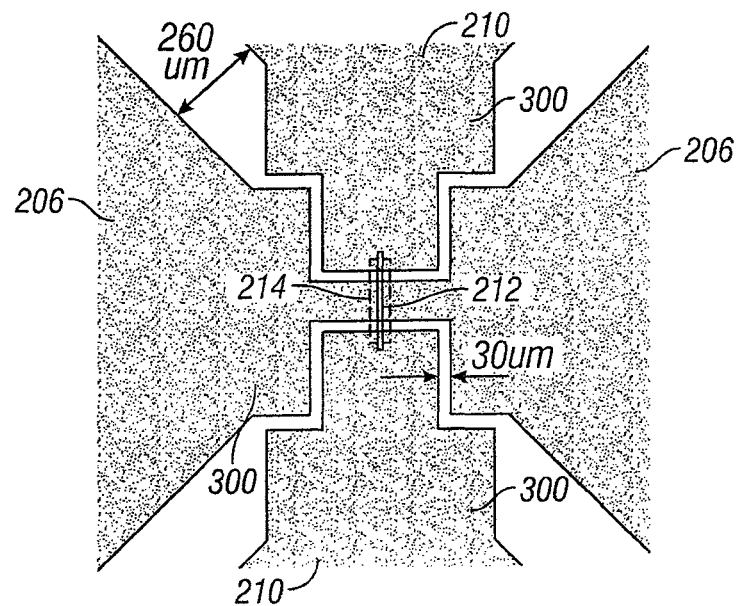
FIG. 5(a) illustrates a close-up view of interconnected truncated diamond-shaped sections according to various embodiments.
Figure 5B:
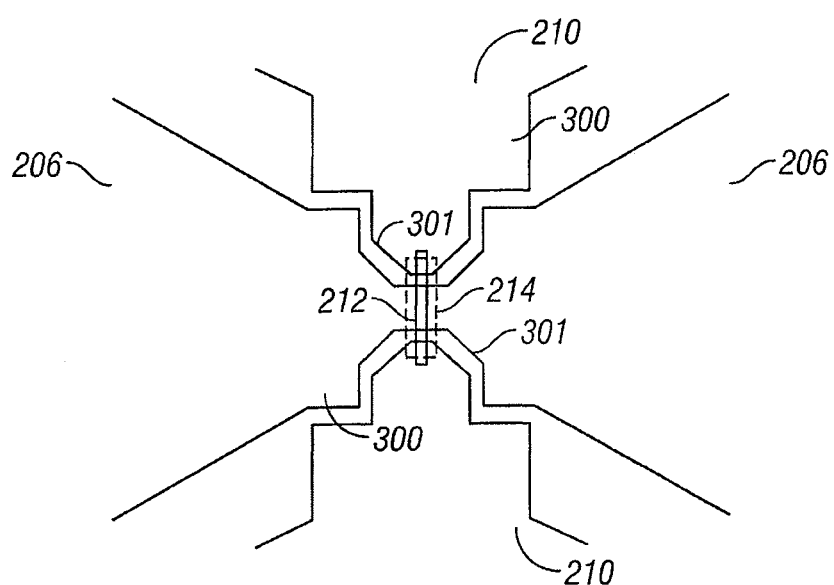
FIG. 5(b) illustrates a close-up view of interconnected truncated diamond-shaped sections with angled arms according to various embodiments FIG. 6 an exemplary array of interconnected truncated diamond-shaped sections and dummy sections according to various embodiments.

FIG. 5(a) is a close-up view of the connections of drive line sections 206 and sense line sections 210, using interconnects 212. Before interconnect 212 is formed, insulating material 214 can be applied over the conductive material (e.g., ITO) layer forming drive and sense lines 206 and 210. Interconnect 212, which can be made of metal or other conductive material, can then be applied over insulating material 214, extending beyond the insulating material to short together sense line sections 210. In alternative embodiments, the process of forming the ITO layer, insulating layer, and metal layer can be reversed, with the metal layer deposited first. In either embodiment, an optional layer of black mask (or other nonreflective material) can be applied over interconnect 212 to reduce negative visual artifacts. As can be seen in FIG. 5(a), arms 300 can be made as wide as possible in order to increase capacitance C, thus reducing resistances Rx and Ry. Arms 300 shown in FIG. 5(a) are merely exemplary arm 300 designs, and variations of arms 300 can be employed without departing from the scope of the present disclosure. For example, in one alternative embodiment, the narrowest arm portion of sections 210, along with the necked-down areas between sections 206, can be formed in an angled manner at sides 301 as shown in FIG. 5b to lower the overall resistance of the sense line sections 210. According to an embodiment, the portion of arm 300 that is interconnecting to another arm 300 can be as narrow as possible, while each arm 300 increases in width as much as possible from the point of interconnecting in order to decrease resistance.

Figure 6:
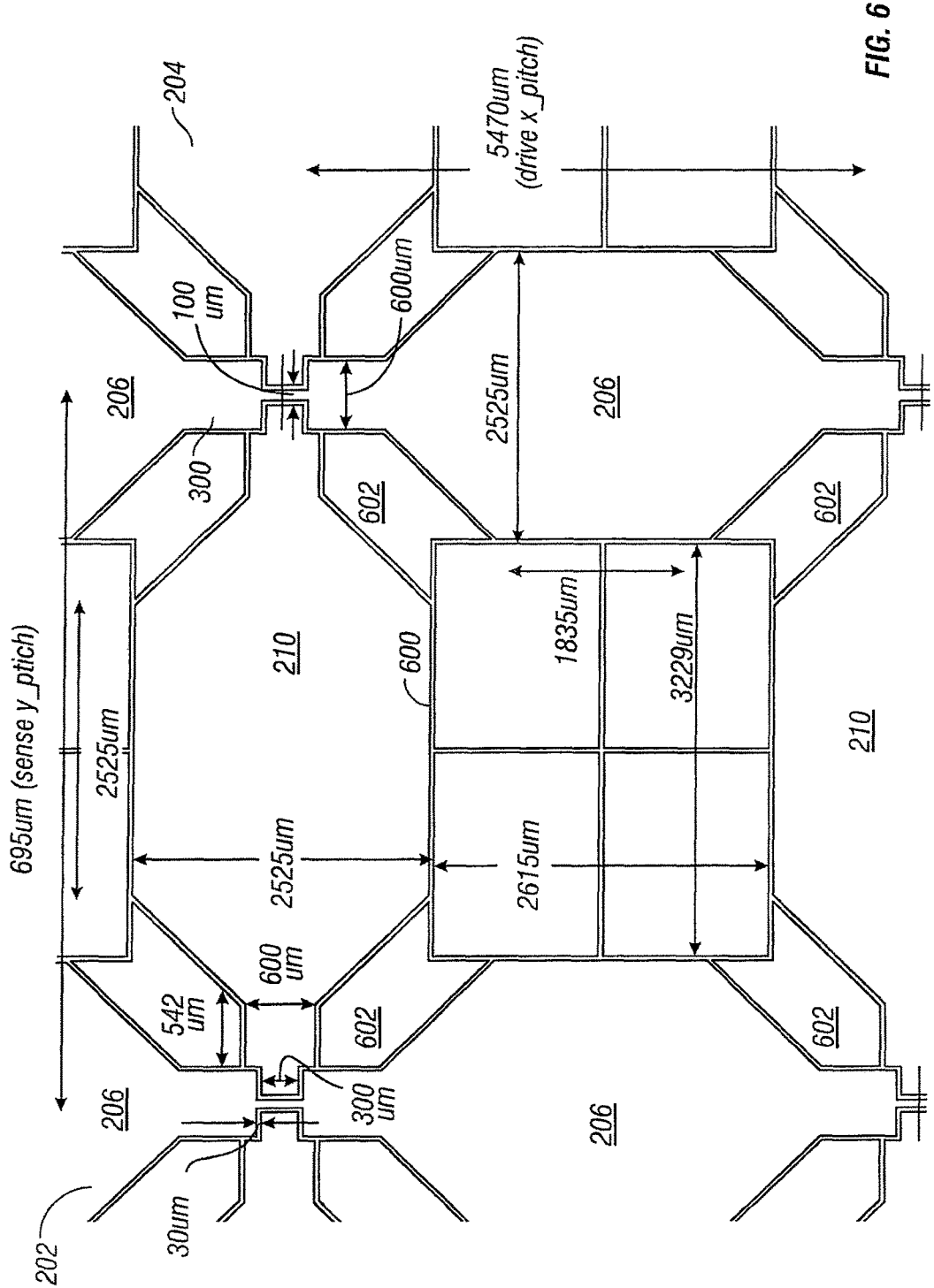

Isolated "dummy" sections can be formed between drive lines 202 and sense lines 204 according to various embodiments. FIG. 6 shows an exemplary array of drive lines 202 and sense lines 204 formed of interconnected sections 206/210 as shown in FIG. 3(d), in which dummy sections 600 and 602 are formed therebetween, according to various embodiments. In particular, generally rectangular dummy sections 600 of the same composition (e.g., ITO) as sections 206 and 210 can be formed between drive lines 202 and sense lines 204 on the same layer as drive lines 202 and sense lines 204. In addition, generally arrow-shaped diagonal dummy sections 602 of the same composition (e.g., ITO) as sections 206 and 210 can be formed between drive lines 202 and sense lines 204 on the same layer as the drive and sense lines. Because of dummy sections 600, almost all areas of the substrate can be covered (i.e. substantially covered) with the same material, providing optical uniformity. In FIG. 6, repeating patterns of four isolated dummy sections 600 and four isolated dummy sections 602 are illustrated for exemplary purposes; however, one of skill in the art would realize that any number of dummy sections 600 and 602 of any number of shapes may be formed on the substrate between drive lines 202 and sense lines 204.

A large parasitic mutual capacitance can be formed between stimulated drive line 202, for example, and dummy sections 600 and 602, but because dummy sections 600 and 602 are isolated, their voltage potential can move along with stimulated drive line 202 and can have minimal or no negative impact on touch detection. Reducing the size of each dummy section 600 and 602 in a particular area, thus increasing the number of dummy sections 600 and 602, can further reduce parasitic mutual capacitance.

Dummy sections 602 can also have a beneficial impact on touch detection. Because drive lines 202 and sense lines 204 can be formed on the same layer on the same side of a substrate, a large static mutual capacitance can be created between them. However, only a relatively small number of the electric field lines between drive lines 202 and sense lines 204 (those that extend beyond the cover of the touch sensor panel) are capable of being influenced by a finger or other object. Most of the electric field lines remain within the confines of the cover and are generally unaffected by a touch event. Therefore, a touch event may only cause a small change in the large static mutual capacitance, making it difficult to detect the touch event. However, with dummy sections 602 in place, instead of having static mutual capacitance form between drive lines 202 and sense lines 204 within the confines of the cover, parasitic mutual capacitance will instead be formed between the drive lines 202 and the dummy sections 602. Removal of static mutual capacitance unaffected by a touch event can improve the touch detection capabilities of the panel, because a higher percentage of the remaining static mutual capacitance can be influenced by a touch event.

FIG. 6 also provides exemplary measurements for sections 206 and 210, arms 300, dummy sections 600 and empty space therebetween. However, it is noted that these measurements are merely used for exemplary purposes and are not intended to limit the sizes or dimensions of components of the touch sensor display.

Figure 7:
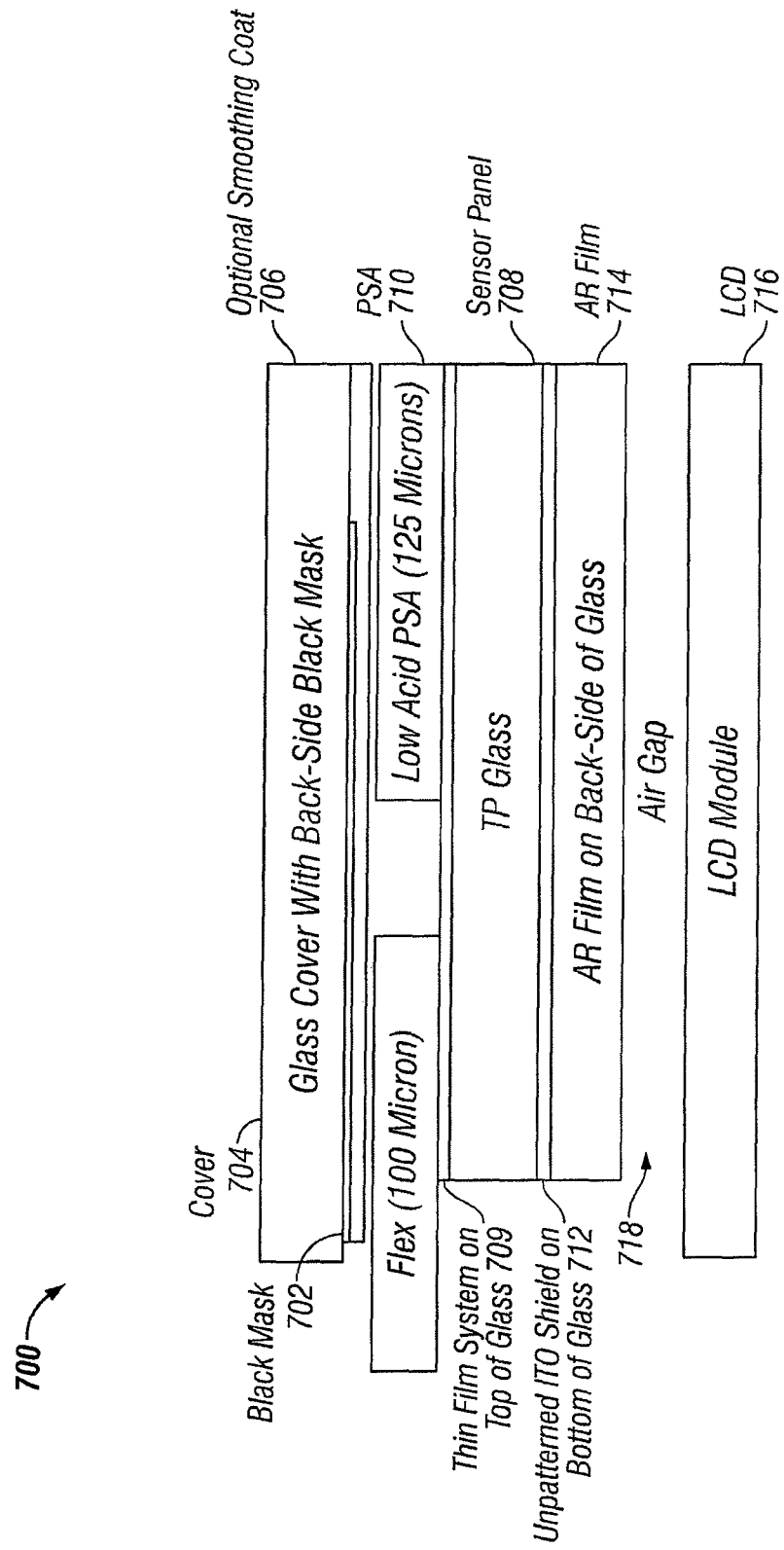
FIG. 7 illustrates exemplary touch screen stackup according to various embodiments.
Figure 8A:
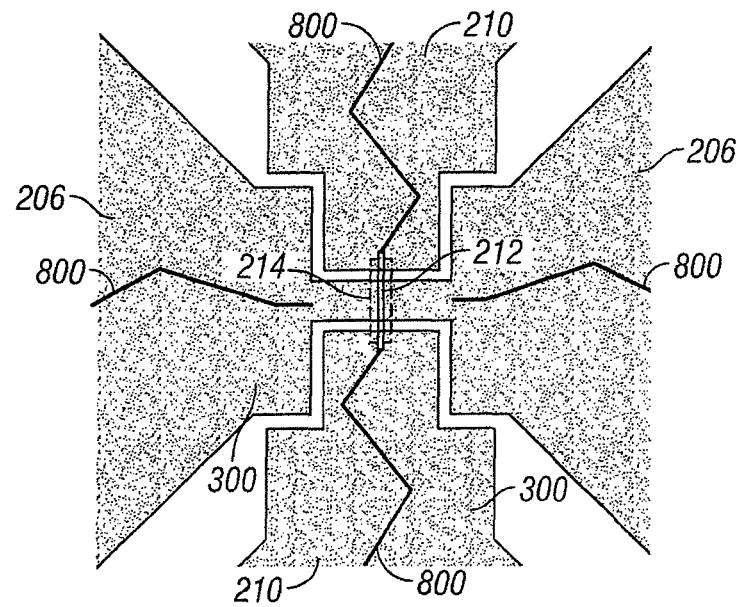
FIG. 8(a) illustrates a close-up view of interconnected truncated diamond-shaped sections with zigzagged metal traces according to various embodiments.
Figure 8B:
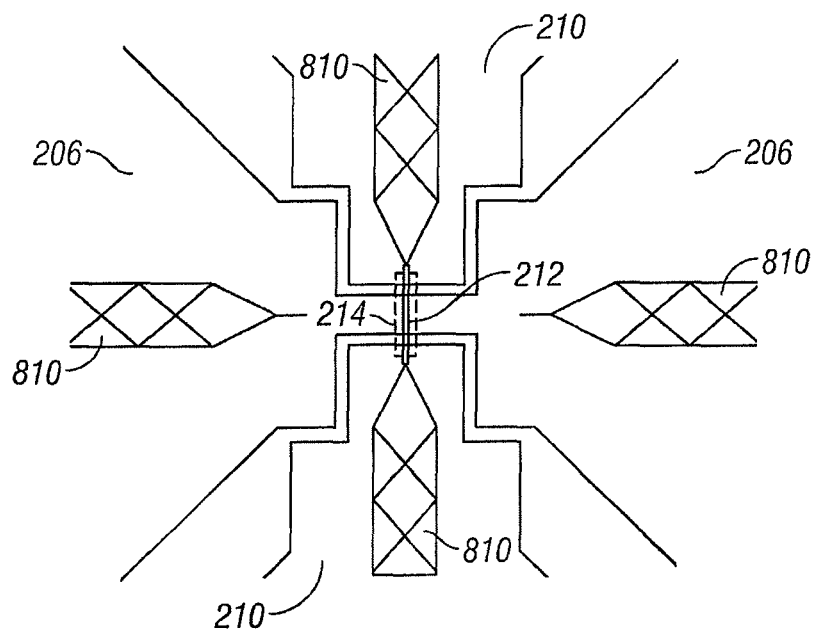
FIG. 8(b) illustrates a close-up view of interconnected truncated diamond-shaped sections with a conductive pattern on each section according to various embodiments.
Figure 8C:
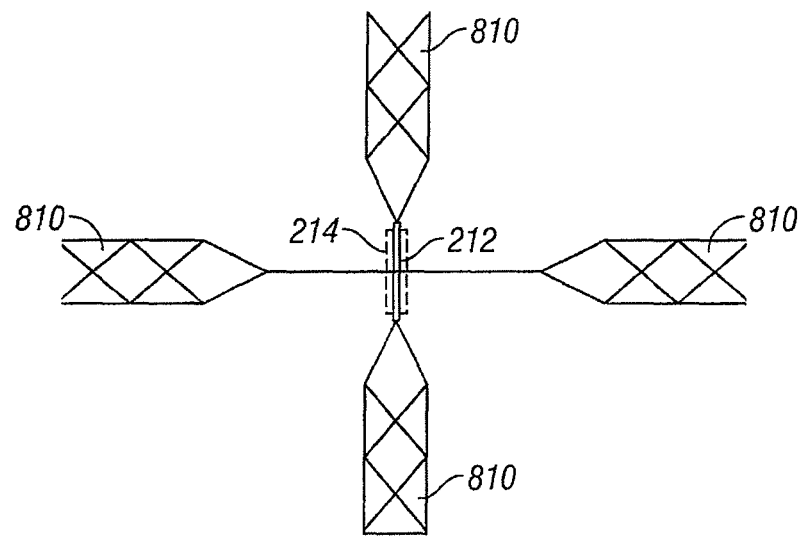
FIG. 8(c) illustrates a close-up view of interconnected patterns without truncated diamond-shaped sections according to various embodiments.
Figure 8D:
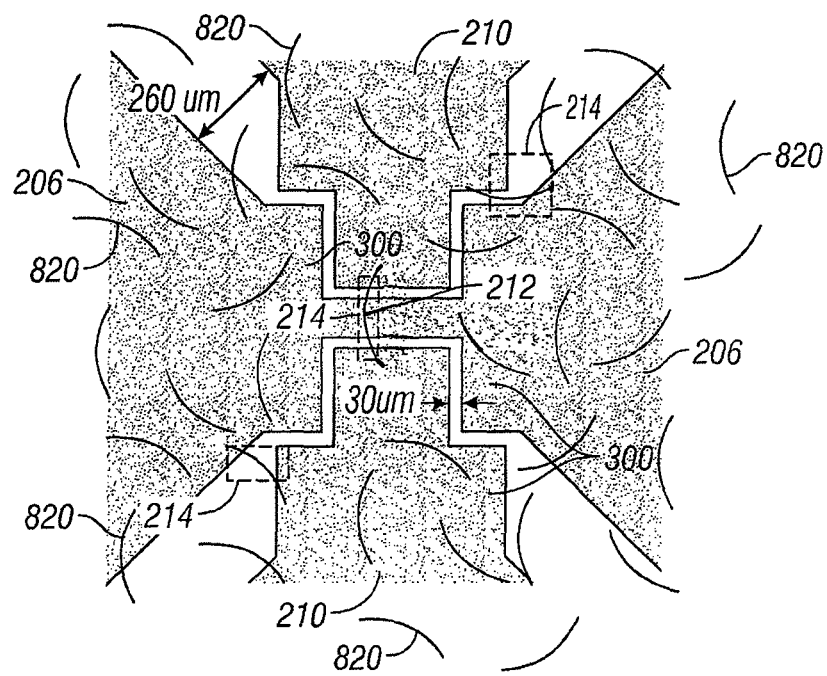
FIG. 8(d) illustrates a close-up view of interconnected truncated diamond-shaped sections with disjointed conductive patterns on each section according to various embodiments.

FIG. 7 illustrates an exemplary touch screen stackup 700 according to various embodiments. It should be understood, however, that the various touch pixel embodiments disclosed herein can also be implemented in other configurations including, but not limited to, on the back side of a cover glass, the back side of the touch panel (TP) glass, or integrated within a display module (e.g., OLED or LCD). In FIG. 7, black mask (or a mask of any color) 702 can be formed on a portion of the back side of cover 704, and an optional smoothing coat 706 can be applied over the black mask and back side of the cover. According to certain embodiments, the black mask may be formed to cover the metal interconnects 212 interconnecting the ITO truncated diamond-shaped sections 210, for example. Accordingly, visual artifacts caused by light reflecting from the metal interconnects 212 may be mitigated. Touch panel 708 of the type described above, with drive lines, sense lines, insulating material and metal jumper (at area 709 in FIG. 7) formed on the same layer on the same side of a glass substrate, can be bonded to the cover with pressure sensitive adhesive (PSA) 710. An unpatterned layer of ITO 712 can optionally be formed on the bottom of the glass to act as a shield. Anti-reflective film 714 can then be deposited over unpatterned ITO 712. LCD module 716 can then be placed beneath the glass substrate, optionally separated by air gap 718 for ease of repair.

FIG. 8(*a*) illustrates an embodiment in which truncated diamond-shaped sections 206 and 210 are interconnected as described above with reference to FIG. 5. However, in the embodiment depicted in FIG. 8(*a*), metal lines (or traces) 800 (or lines of other conductive material) are electrically connected substantially in parallel to at least one drive line 202 and/or sense line 204. Metal traces 800 can be formed on the same layer and from the same material as interconnect 212. Metal traces 800 electrically connected to sense line sections 210 can be directly connected to interconnect 212, while in some embodiments metal traces 800 electrically connected to drive line sections 206 can be terminated at the end of arm area 300 as shown in FIG. 8(*a*). However, in other embodiments, metal traces 800 electrically connected to drive line sections 206 can be connected together in an unbroken fashion, separated from interconnect 212 by insulating material 214. The metal traces 800 can have a significantly lower resistance as compared to the ITO sections 206 and 210 (ITO sheet resistance may be ~140 Ohms, while metal sheet resistance may be ~0.3 Ohms). Thus, adding the lower-resistance metal traces 800 can result in a lower resistance drive lines 202 and sense lines 204.

In the depicted embodiment, the metal traces are zigzagged in order to minimize visual artifacts when viewing the LCD, for example, through the touch panel sensor 124. The zigzag pattern can avoid Moiré or other negative visual effects that can result from the metal traces being in alignment with the LCD structures. Alternatively, the pattern can be designed to be aligned over the black mask areas of the LCD to minimize blocking of the displayed image. However, the traces 800 may be straight or in any zigzag pattern without departing from the scope of the present disclosure. The metal traces 800 can be connected to metal interconnect 212, according to an embodiment. The metal traces 800 may be connected or disconnected between sections 206, for example. In addition, although FIG. 8(*a*) only shows a single metal line 800 for each section 206 or 210, in other embodiments any interconnected conductive pattern 810, made up of one or more traces of one or more conductive materials) may be formed in electrical contact with each of the sections to lower the resistance of those sections, as shown in FIG. 8(*b*). In some embodiments, these patterns 810 can be made uniform to minimize the negative visual artifacts created by the addition of the metal traces. In still further embodiments, sections 206 and 210 can be entirely replaced by interconnected conductive patterns 810, as shown in FIG. 8(*c*).

It is noted that the multiple conductive patterns 810 are not limited to any particular pattern 810, and one of skill in the art would realize that various patterns 810 can be formed within the scope of the present disclosure. For example, FIG. 8(*d*) shows an embodiment where disjointed conductive patterns 820 are disposed in one or more random orientations. Disjointed conductive patterns 820 provide lower resistance drive lines 202 and sense lines 204, as well as being optically uniform at a distance, to make the disjointed conductive patterns 820 less visible. Any number of disjointed conductive patterns 820 can be included, and various different disjointed conductive patterns 820 may be formed in each of drive lines 202 and sense lines 204. While the embodiment depicted in FIG. 8(*a*) can optimize conductance (potentially better than the embodiment of FIG. 8(*d*)) wire visibility can be reduced with disjointed conductive patterns 820, as in FIG. 8(*d*). Referring to FIG. 8(*d*), insulating material 214 can be included (as described above) when the conductive patterns 820 happen to fall where they cross between sections 206 and/or 210, in order to avoid shorting between sections 206 and/or 210. Of course, all or portions of each of the embodiments of FIGS. 8(*a*)-8(*d*) may be used alone or in combination without departing from the scope of the present disclosure.

In an alternate embodiment, the entire array of drive lines 202 and sense lines 204 can be rotated a predetermined amount (e.g., 15, 30 or 60 degrees) relative to the display module 716, for example, in order to minimize visual artifacts caused by the metal lines 800.

Figure 9:
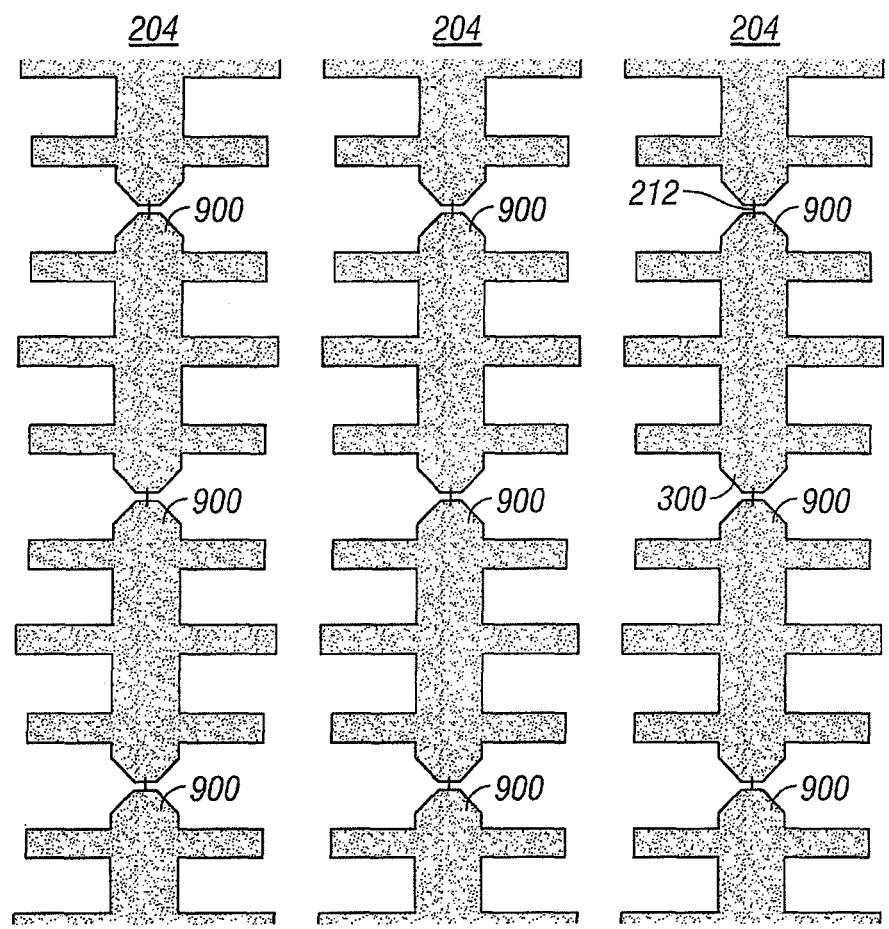
FIG. 9 illustrates exemplary columns of interdigitated comb design sections according to various embodiments.
Figure 10:
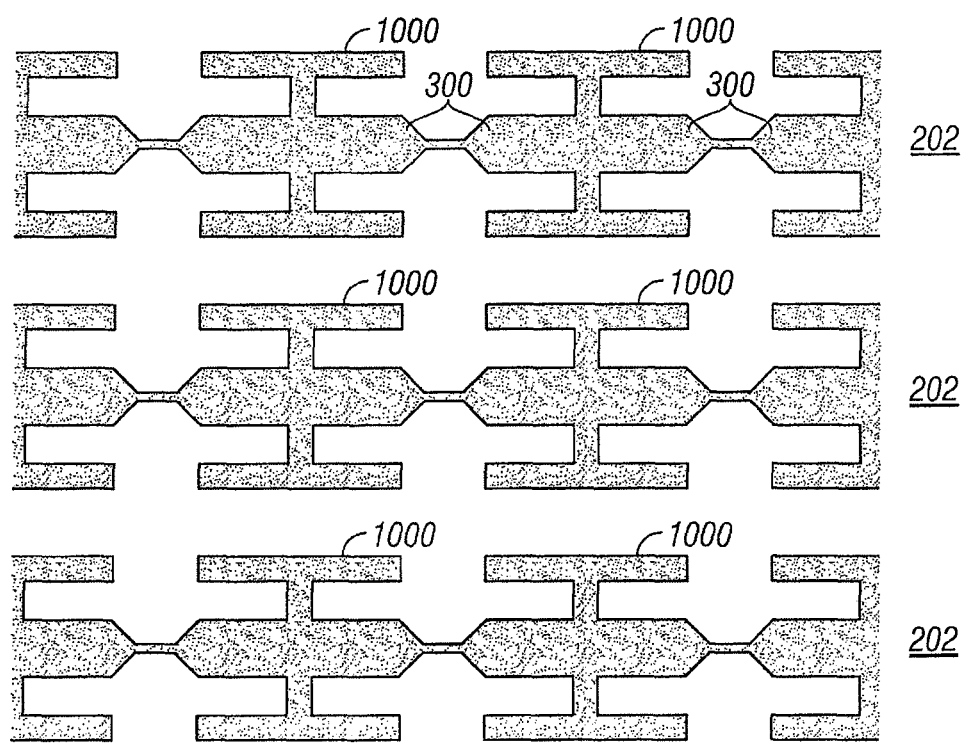
FIG. 10 illustrates exemplary drive lines of interdigitated comb design sections according to various embodiments.
Figure 11:
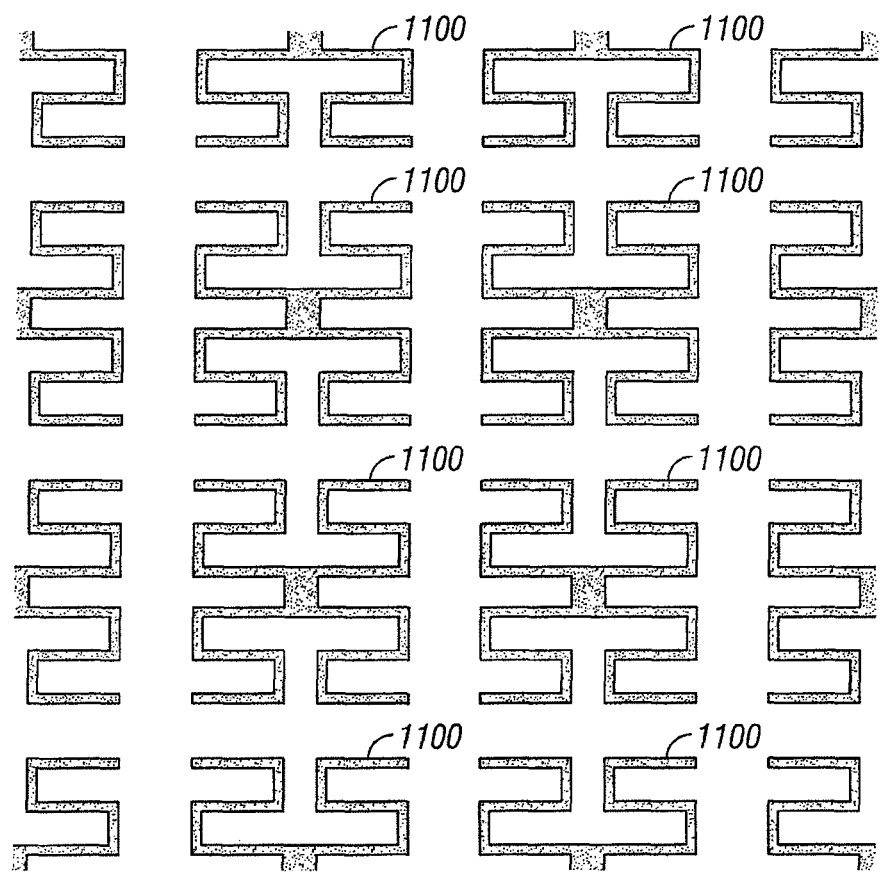
FIG. 11 illustrates exemplary dummy sections according to various embodiments.

Alternative designs for sections 206 and 210 and dummy sections can be used in order to maintain touch sensitivity while minimizing negative visual artifacts. FIGS. 9-11 respectively show exemplary columns 204, rows 202 and dummy sections 1100 that may be combined to form a touch sensor panel, according to an embodiment. Of course, it is noted that the rows 202, columns 204 and dummy sections 1100 can be formed during a single deposition and patterning step, while interconnects 212 can be formed separately (either before or after the single deposition and patterning step). FIG. 9 shows an example of interdigitated comb design sections 900 interconnected by interconnects 212 to form sense lines 204. The embodiment depicted in FIG. 9 shows sections 900 with three extending digits on either side of each section 900. However, three extending digits are merely depicted as an example, and any number or size of extending portions can be used.

FIG. 10 depicts an example of interdigitated comb design sections 1000 to form drive lines 202. This particular shape of sections 1000 can be chosen because of its correspondence with the chosen comb design of sections 900 in sense lines 204 of FIG. 9; however, one of ordinary skill in the art would realize that various designs of sections 900 in combination with sections 1000 can be used. It should be understood that the interlocking extending digits of sections 900 and 1000 can result in an increased amount of static mutual capacitance and increased touch detection capabilities.

Sections 900 and 1000 can be formed of a substantially transparent conductive material, such as ITO. Alternatively, sections 900 and/or 1000 can be made up of thin opaque metal lines in an interconnected web design to form rows 202 and columns 204. The web design of sections 900 and/or 1000 can include any number of digits disposed in various directions, and each digit can include any number of sub-digits branching therefrom.

FIG. 11 shows an example array of dummy sections 1100, which can be disposed in the empty area of the substrate 708 that is not covered by sections 900 and 1000. As noted above, dummy sections 1100 can be formed of the same conductive material as sections 900 and 1000 (e.g., ITO), and provide uniformity on the substrate, thereby reducing visual artifacts and parasitic capacitance. Dummy sections 1100 can also improve the touch detection capabilities of the panel by eliminating static mutual capacitance that is incapable of being influenced by a touch event.

Figure 12:
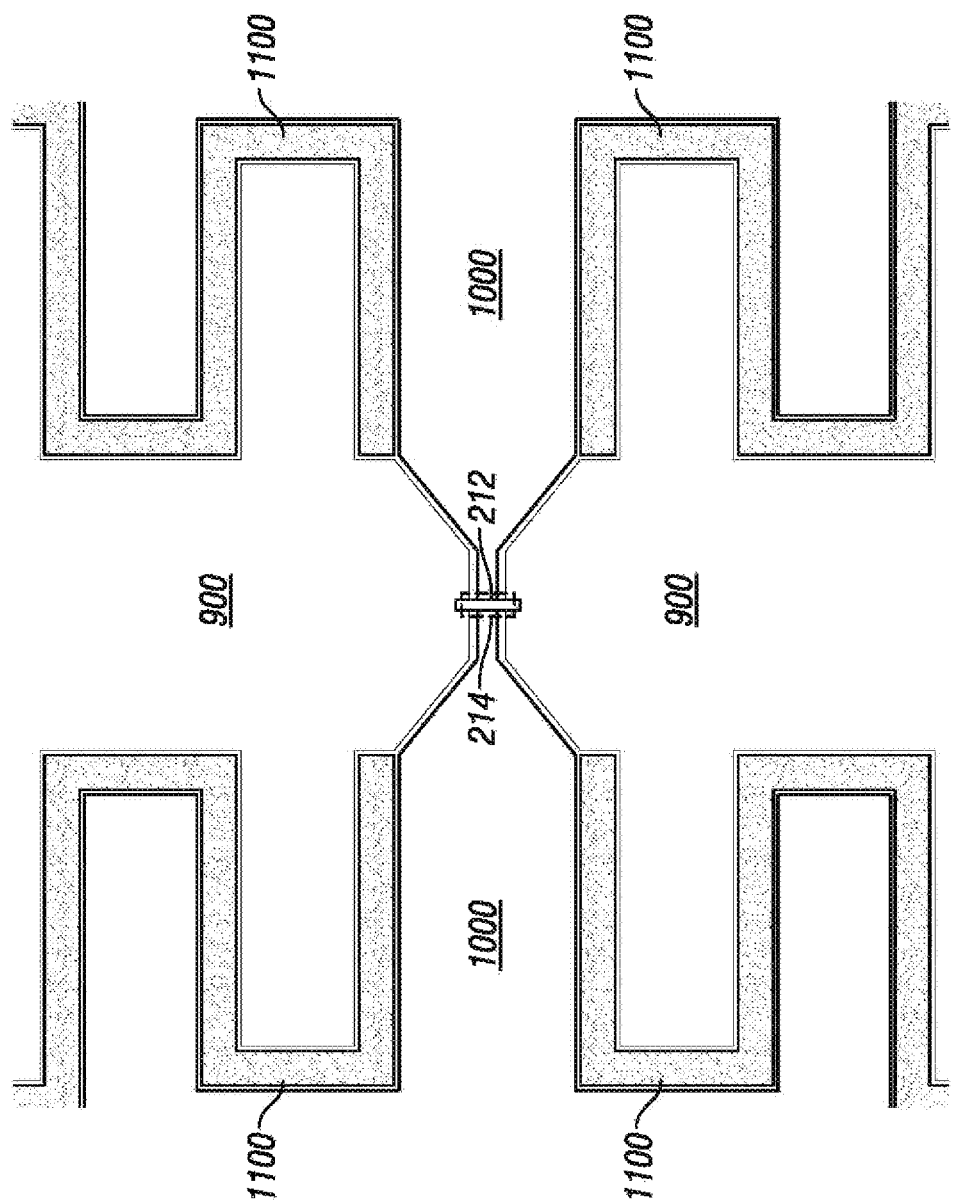
FIG. 12 illustrates a close-up view of connected interdigitated comb sections and dummy sections according to various embodiments.

FIG. 12 is a close-up view of interconnected row sections 1000, as well as column sections 900 interconnected using an insulator 214 and metal interconnect 212. As shown in FIG. 12, dummy sections 1100 can substantially fill the empty space between sections 900 and 1000.

Figure 13A:
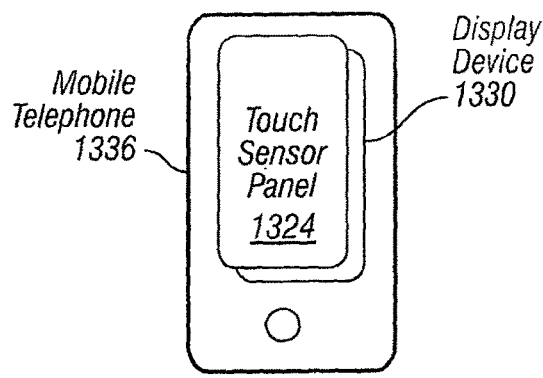
FIG. 13(a) illustrates an exemplary mobile telephone that can include a touch sensor panel according to the various embodiments described herein.
Figure 13B:
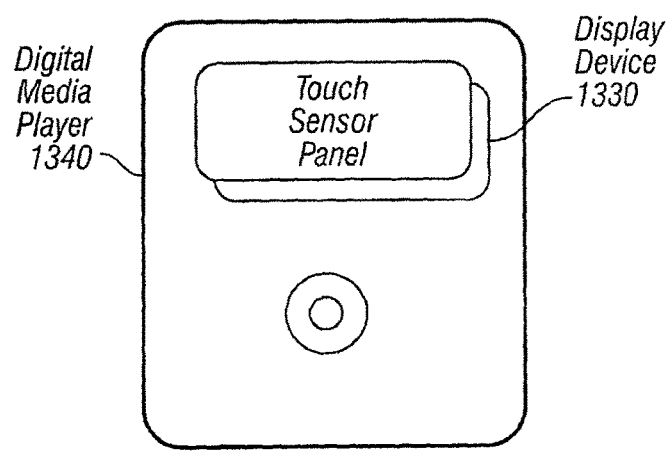
FIG. 13(b) illustrates an exemplary digital media player that can include a touch sensor panel according to the various embodiments described herein.
Figure 13C:
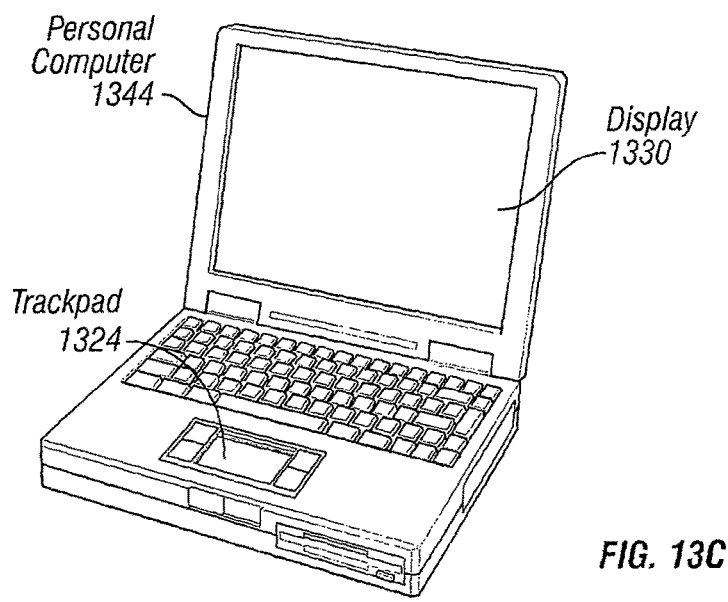
FIG. 13(c) illustrates exemplary personal computer that can include a touch sensor panel according to the various embodiments described herein

FIG. 13(*a*) illustrates an example mobile telephone 1336 that can include touch sensor panel 1324 and display device 1330, the touch sensor panel including a touch pixel design according to one of the various embodiments described herein.

FIG. 13(*b*) illustrates an example digital media player 1340 that can include touch sensor panel 1324 and display device 1330, the touch sensor panel including a touch pixel design according to one of the various embodiments described herein.

FIG. 13(*c*) illustrates an example personal computer 1344 that can include touch sensor panel (trackpad) 1324 and display 1330, the touch sensor panel and/or display of the personal computer (in embodiments where the display is part of a touch screen) including a touch pixel design according to the various embodiments described herein.

While various embodiments have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

What is claimed is:

1. A touch sensor panel comprising:
   a substantially transparent substrate;
   a plurality of first touch sensor lines disposed on the substrate and including a plurality of first sections, each first section comprising:
      a first sub-section oriented along a second dimension of the touch sensor panel, and
      a plurality of second sub-sections extending from the first sub-section along a first dimension of the touch sensor panel; and
   a plurality of second touch sensor lines disposed on the substrate and including a plurality of second sections, each second section comprising:
      a third sub-section oriented along the second dimension, and
      a plurality of fourth sub-sections extending from the third sub-section along the first dimension,
   wherein the plurality of second sections is continuously connected on a same layer as the plurality of second sections is formed, wherein the continuous connection is along the first dimension;
   wherein the plurality of first touch sensor lines and the plurality of second touch sensor lines are configured to form an array of capacitive sensing nodes.

2. The touch sensor panel of claim 1, further comprising a plurality of interconnect sections configured for enabling the plurality of first touch sensor lines and the plurality of second touch sensor lines to cross over each other to form the array of capacitive sensing nodes.

3. The touch sensor panel of claim 1, wherein the first dimension is oriented perpendicular to the second dimension.

4. The touch sensor panel of claim 1, wherein the plurality of first sections is formed on the same layer, which is a single layer.

5. The touch sensor panel of claim 4, further comprising a plurality of dummy regions located on the same layer, wherein the same layer substantially occupies a full area of the substantially transparent substrate.

6. The touch sensor panel of claim 1, wherein each capacitive sensing node is associated with one pixel of a touch image.

7. The touch sensor panel of claim 1, further comprising one or more dummy regions, each dummy region located at least partially between first and second touch sensor lines.

8. The touch sensor panel of claim 7, wherein each dummy region is interlocked with some of the plurality of first sections and some of the plurality of second sections.

9. The touch sensor panel of claim 1, wherein the substantially transparent substrate is a cover material.

10. The touch sensor panel of claim 1, wherein the first sub-section includes truncated ends.

11. The touch sensor panel of claim 1, wherein one fourth sub-section includes truncated ends.

12. The touch sensor panel of claim 1, wherein each second section is interlocked with some of the plurality of first sections.

13. The touch sensor panel of claim 1, wherein a width of the first sub-section is greater than a width of each of the plurality of second sub-sections, and further wherein a width of one fourth sub-section is greater than a width of the other fourth sub-sections and the third sub-section.

14. The touch sensor panel of claim 1, wherein the plurality of second sub-sections includes three second sub-sections and the plurality of fourth sub-sections includes three fourth sub-sections.

15. The touch sensor panel of claim 1, wherein the plurality of first touch sensor lines are sense lines and the plurality of second touch sensor lines are drive lines.

* * * * *